(12) United States Patent
Jung et al.

(10) Patent No.: US 10,646,846 B2
(45) Date of Patent: May 12, 2020

(54) FABRICATION OF CARBON NANORIBBONS FROM CARBON NANOTUBE ARRAYS

(71) Applicants: Northeastern University, Boston, MA (US); Massachusetts Institute of Technology, Cambridge, MA (US)

(72) Inventors: Yung Joon Jung, Lexington, MA (US); Hyun Young Jung, Malden, MA (US); Swastik Kar, Belmont, MA (US); Chi Won Ahn, Deajeon (KR); Mildred Dresselhaus, Arlington, MA (US); Paulo Antonio Trindade Araujo, Belo Horizonte-MG (BR)

(73) Assignees: Northeastern University, Boston, MA (US); Massachusetts Institute of Technology, Cambridge, MA (US)

( * ) Notice: Subject to any disclaimer, the term of this patent is extended or adjusted under 35 U.S.C. 154(b) by 554 days.

(21) Appl. No.: 15/510,789

(22) PCT Filed: Sep. 14, 2015

(86) PCT No.: PCT/US2015/050002
§ 371 (c)(1),
(2) Date: Mar. 13, 2017

(87) PCT Pub. No.: WO2016/040948
PCT Pub. Date: Mar. 17, 2016

(65) Prior Publication Data
US 2017/0247257 A1    Aug. 31, 2017

Related U.S. Application Data

(60) Provisional application No. 62/049,440, filed on Sep. 12, 2014.

(51) Int. Cl.
*B01J 19/08* (2006.01)
*C01B 32/16* (2017.01)
(Continued)

(52) U.S. Cl.
CPC ............ *B01J 19/087* (2013.01); *C01B 32/16* (2017.08); *C01B 32/168* (2017.08); *C01B 32/18* (2017.08);
(Continued)

(58) Field of Classification Search
CPC ............ B01J 19/087; B01J 2219/0803; B01J 2219/0879; H01B 1/04; C01B 2204/04;
(Continued)

(56) References Cited

U.S. PATENT DOCUMENTS

| | | | |
|---|---|---|---|
| 2009/0226361 A1* | 9/2009 | Campos-Delgado | ........................ B82Y 30/00 423/447.2 |
| 2010/0142259 A1 | 6/2010 | Drndic et al. | |
| 2014/0127415 A1 | 5/2014 | Assadi et al. | |

FOREIGN PATENT DOCUMENTS

WO    2013056182 A1    4/2013

OTHER PUBLICATIONS

Zhao, et al., Comparative Study of Multilayer Graphene Nanoribbon (MLGNR) Interconnects, IEEE Transactions on Electromagnetic Compatibility 2014; 56(3): 638-645 (Year: 2014).*

(Continued)

*Primary Examiner* — Daniel C. McCracken
(74) *Attorney, Agent, or Firm* — Verrill Dana, LLP

(57) ABSTRACT

Inter-allotropic transformations of carbon are provided using moderate conditions including alternating voltage pulses and modest temperature elevation. By controlling the pulse magnitude, small-diameter single-walled carbon nanotubes are transformed into larger-diameter single-walled carbon nanotubes, multi-walled carbon nanotubes of different morphologies, and multi-layered graphene nanoribbons.

17 Claims, 14 Drawing Sheets

(51) Int. Cl.
| | |
|---|---|
| *C01B 32/168* | (2017.01) |
| *C01B 32/18* | (2017.01) |
| *C01B 32/184* | (2017.01) |
| *H01B 1/04* | (2006.01) |
| *B82Y 30/00* | (2011.01) |
| *B82Y 40/00* | (2011.01) |

(52) U.S. Cl.
CPC ............. *C01B 32/184* (2017.08); *H01B 1/04* (2013.01); *B01J 2219/0803* (2013.01); *B01J 2219/0879* (2013.01); *B82Y 30/00* (2013.01); *B82Y 40/00* (2013.01); *C01B 2202/08* (2013.01); *C01B 2204/04* (2013.01); *C01B 2204/06* (2013.01); *C01B 2204/22* (2013.01); *C01B 2204/24* (2013.01); *Y10S 977/734* (2013.01); *Y10S 977/842* (2013.01); *Y10S 977/932* (2013.01)

(58) Field of Classification Search
CPC ............ C01B 2204/06; C01B 2204/22; C01B 2204/24; C01B 32/184; C01B 32/16; C01B 32/168; C01B 32/18; C01B 2202/08; Y10S 977/734; Y10S 977/842; Y10S 977/932; B82Y 30/00; B82Y 40/00
See application file for complete search history.

(56) References Cited

OTHER PUBLICATIONS

Li, et al., Carbon nanomaterials: the ideal interconnect technology for next-generation ICs, IEEE Des. Test Comput.,2010; 27(4): 20-31 (Year: 2010).*

Hu J et al. Thermal Conductivity and Thermal Rectification in Graphene Nanoribbons: A Molecular Dynamics Study. Nano Letters, vol. 9, No. 7, pp. 2730-2735 (2009).

Terrones M et al. Coalescence of Single-Walled Carbon Nanotubes. Science May 19, 2000: vol. 288, Issue 5469, pp. 1226-1229.

Gutierrez H et al. Thermal Conversion of Bundled Carbon Nanotubes into Graphitic Ribbons. Nano Letters, vol. 5, No. 11, pp. 2195-22011 (2005).

Yao Y et al. Temperature-mediated growth of single-walled carbon-nanotube intramolecular junctions. Nat. Mat. 6, 283-286 (2007).

* cited by examiner

FABRICATION OF CARBON NANORIBBONS FROM CARBON NANOTUBE ARRAYS

STATEMENT REGARDING FEDERALLY SPONSORED RESEARCH OR DEVELOPMENT

The invention was developed with financial support from Grant Nos. CMMI 0927088 and ECCS-1202376 from the National Science Foundation and Department of Energy Contract No. DE-SC0001299/DE-FG02-09EF46577. The U.S. Government has certain rights in the invention.

BACKGROUND

Carbon nanotubes offer a unique combination of physical properties and chemical stability (1). Carbon nanotube networks are anticipated to be used in applications such as reinforcements for lightweight and high performance composites, multifunctional membranes, electronics, and electrodes for energy storage devices (2-6). However, most assembled carbon nanotube networks are based on weak van der Waals interactions between the nanotubes (7). As a result, the reported experimental mechanical strength, and electrical and thermal conductivities are several orders of magnitude lower than theoretical predictions due to a lower mechanical pulling resistance between nanotubes, and a higher electron and phonon scattering at the junctions between nanotubes. Recently, there has been success in transforming these van der Waals interactions into covalently bonded molecular junctions (8-29). For example, electron (11,19-21) and ion (11) irradiation as well as electrical current sources (23-27) have been used to modify the structure and morphology of nanocarbon materials. However, these rearrangement studies achieved only local changes at junctions in a few individual nanotubes (11-21, 25) and the destruction of carbon layers on electrical breakdown (23,26,27). Furthermore, the reported reconstruction methods require high to extremely high temperature (750-2,200° C.) conditions (20,22,28), making them power-intensive and incompatible with various scalable processes. Therefore, developing a fast and scalable method for reproducibly creating particular types of covalently bonded C—C junctions and $sp^2$ molecular structures in nanocarbon networks that result in repeatable physical properties has remained a fundamental challenge.

SUMMARY OF THE INVENTION

The invention provides a method for fabricated carbon nanomaterials containing $sp^2$ inter-nanotube junctions and related allotropic structures by applying controlled alternating voltage pulses across single-walled carbon nanotube (SWCNT), multiwalled carbon nanotube (MWCNT), and carbon nanotube fiber networks, bundles, or arrays under mild conditions. The method results in transformations across entire carbon nanotube networks (electrode to electrode), which were characterized point-by-point with Raman spectroscopy and were also visually inspected using transmission electron microscopy (TEM) before and after the voltage pulse cycling was completed. The transformation process can be controlled by electrical parameters including the amplitude, number of cycles, and duty cycle of an alternating voltage pulse. Nearly the entire Raman and TEM-inspected regions of SWCNT networks were found to be transformed uniformly and reproducibly, mostly into either larger diameter SWCNT, multi-walled carbon nanotubes (MWCNT) or multi-layered graphene nanoribbons (MGNR). The newly formed nanocarbon network retains its $sp^2$ covalent bonds and seamless structures, while structural defects are not increased during the transformational process. The method is easily scalable and extendible into 2-3 dimensional (29) and multiscale (nano- to macro-scale) applications.

One aspect of the invention is a method for allotropic transformation of a carbon nanotube material. The method includes the steps of: (a) providing a network of the carbon nanotube material, the network spanning a gap between two electrodes and in electrical contact with each of the two electrodes; (b) applying a voltage ($V_a$) between the electrodes at a temperature above ambient temperature, wherein the voltage is less than the breakdown voltage ($V_b$) of the network of carbon nanotube material; and (c) cyclically reversing the polarity of $V_a$ for a total of n voltage cycles, whereby at least a portion of the $sp^2$ carbon material undergoes allotropic transformation.

Another aspect of the invention is a multilayered graphitic nanoribbon (MGNR) carbon material produced by the method described above.

Yet another aspect of the invention is a circuit comprising the MGNR material described above, serving as a conductor.

Another aspect of the invention is a composition comprising carbon fibers containing graphene nanoribbons.

Still another aspect of the invention is a composite structural material comprising the MGNR material described above.

Another aspect of the invention is an electronic device comprising a network of multilayered graphene nanoribbons, the network bridging a gap between two electrodes and in electrical contact with each of the two electrodes.

The invention can be further summarized by the following list of items.

1. A method for allotropic transformation of a carbon nanotube material, the method comprising the steps of:
   (a) providing a network of the carbon nanotube material, the network spanning a gap between two electrodes and in electrical contact with each of the two electrodes;
   (b) applying a voltage ($V_a$) between the electrodes at a temperature above ambient temperature, wherein the voltage is less than the breakdown voltage ($V_b$) of the network of $sp^2$ carbon material;
   (c) cyclically reversing the polarity of $V_a$ for a total of "n" voltage cycles, whereby at least a portion of the carbon nanotube material undergoes allotropic transformation.
2. The method of item 1, wherein $1000 \leq n \leq 3000$.
3. The method of item 1 or 2, wherein $V_a$ is in the range from $0.4V_b$ to $0.8V_b$.
4. The method of any of the previous items, wherein the polarity of $V_a$ is switched at a frequency of from about 0.1 to about 200 Hz.
5. The method of any of the previous items, wherein the polarity of $V_a$ is switched at a frequency of about 100 Hz.
6. The method of any of the previous items, wherein $V_a$ is applied as a series of DC pulses, and wherein each pulse is applied for a period of from about 2 msec to about 1000 msec.
7. The method of any of the previous items, wherein each cycle consists of a positive pulse of amplitude $V_a$, a negative pulse of amplitude $-V_a$, and periods between the pulses where $V_a=0$.
8. The method of any of the previous items, wherein the positive and negative pulses last for about 10% of the cycle.
9. The method of any of the previous items, wherein the carbon nanotube material comprises single walled carbon nanotubes (SWCNT), multiwalled carbon nanotubes (MWCNT), or carbon nanotube fiber.

10. The method of any of the previous items, wherein the SWCNT, MWCNT, or carbon nanotube fibers are aligned along an axis extending between the electrodes.

11. The method of any of the previous items, wherein the carbon nanotube material comprises carbon nanotubes at a density of about 18,000-22,000 SWCNT per µm².

12. The method of any of the previous items, wherein the carbon nanotube material comprises SWCNT and the allotropic transformation produces an increase in SWCNT diameter of about 30% to about 40%.

13. The method of any of the previous items, wherein the carbon nanotube material comprises SWCNT and the allotropic transformation produces small bundles of SWCNT having less than 10 SWCNT per bundle.

14. The method of any of the previous items, wherein the carbon nanotube material comprises SWCNT and the allotropic transformation produces large bundles of SWCNT having 10 or more SWCNT per bundle.

15. The method of any of the previous items, wherein $V_a$ is about $0.6V_b$.

16. The method of any of the previous items, wherein the carbon nanotube material comprises SWCNT and the allotropic transformation produces multiwalled carbon nanotubes (MWCNT).

17. The method of any of the previous items, wherein the MWCNT have diameters in the range from about 15 nm to about 30 nm.

18. The method of any of the previous items, wherein some of the MWCNT have incomplete outer wall structure.

19. The method of any of the previous items, wherein the MWCNT have essentially complete outer wall structure.

20. The method of any of the previous items, wherein $V_a$ is from about $0.6V_b$ to about $0.8V_b$.

21. The method of any of the previous items, wherein the allotropic transformation produces multilayered graphene nanoribbons (MGNR).

22. The method of any of the previous items, wherein at least some of the MGNR are in the form of flattened stacks.

23. The method of any of the previous items, wherein at least some of the MGNR are in the form of closed end structures.

24. The method of any of the previous items, wherein at least some of the MGNR are in the form of open end structures.

25. The method of any of the previous items, wherein $V_a$ is about $0.8V_b$.

26. The method of any of the previous items, wherein the allotropic transformation produces multilayered graphitic nanoribbons (MGNR).

27. The method of any of the previous items, wherein the carbon nanotube material comprises SWCNT.

28. The method of any of the previous items, wherein the carbon nanotube material consists of SWCNT.

29. The method of any of the previous items, wherein the carbon nanotube material comprises MWCNT.

30. The method of any of the previous items, wherein the carbon nanotube material consists of MWCNT.

31. The method of any of the previous items, wherein the carbon nanotube material comprises carbon nanotube fibers.

32. The method of any of the previous items, wherein the carbon nanotube material consists of carbon nanotube fibers.

33. The method of any of the previous items, wherein carbon-carbon $sp^2$ bonds of the carbon nanotube material are rearranged and coalescence-induced modes increase in Raman spectra of the material.

34. The method of any of the previous items, wherein some $sp^2$ bonds in the carbon nanotube material are converted to $sp^3$ bonds.

35. The method of any of the previous items, wherein steps (b) and (c) are performed at a temperature in the range from about 120° C. to about 400° C.

36. The method of any of the previous items, wherein steps (b) and (c) are performed at a temperature of about 180° C.

37. The method of any of the previous items, wherein the method is performed at a temperature below 200° C.

38. The method of any of the previous items, wherein steps (b) and (c) are performed in a vacuum.

39. The method of any of the previous items, wherein the carbon nanotube material and two electrodes are part of a circuit on a chip, and said method is part of a manufacturing process for the chip.

40. The method of any of the previous items, wherein structural defects initially present in the carbon nanotube material are reduced.

41. The method of any of the previous items, wherein the allotropic transformation progresses from forming MWCNT to forming MGNR as the number of voltage cycles increases.

42. The method of any of the previous items, wherein the number of voltage cycles is selected so as to produce a desired allotropic form or mixture of allotropic forms of carbon material.

43. The method of any of the previous items, wherein at least 50% of the initial carbon nanotube material is transformed into a different allotropic form.

44. The method of any of the previous items, wherein at least 90% of the initial carbon nanotube material is transformed into a different allotropic form.

45. The method of any of the previous items, wherein essentially all of the initial carbon nanotube material is transformed into a different allotropic form.

46. The method of any of the previous items, wherein essentially all of the initial carbon nanotube material is transformed into MGNR.

47. A multilayered graphene nanoribbon (MGNR) carbon material produced by the method of any of the previous items.

48. A circuit comprising the MGNR material of item 47.

49. A composite structural material comprising the MGNR material of item 47.

50. An electronic device comprising a network of multilayered graphene nanoribbons, the network bridging a gap between two electrodes and in electrical contact with each of the two electrodes.

51. An MGNR material having a thermal conductivity of at least 250 W mK$^{-1}$.

BRIEF DESCRIPTION OF THE DRAWINGS

FIGS. 2A, 2C and 2E show low magnification scanning electron microscope (SEM) views, and FIGS. 2B, 2D, and 2F show high magnification transmission electron microscope (TEM) views. FIGS. 2A and 2B show a region of the initial SWCNT that are aligned horizontally and span the gap between the electrodes that run vertically and the left and right edges of the image in FIG. 2A (scale bar is 500 nm). FIG. 2C (scale bar 20 nm) and 2D show MWCNT produced after 2000 cycles of pulses at + and −2.5V (20 A/cm$^2$) and FIG. 2E (scale bar 100 nm) and 2F show MGNR formed by 3000 cycles of the same voltage pulsing protocol. Voltage pulsing was performed at 1 Hz and the temperature was 180° C.

FIG. 5A shows bundles of aligned SWCNT. FIG. 5B shows an SWCNT having an enlarged diameter. FIG. 5C shows a hollow MWCNT structure having gaps in its outer wall layers. FIG. 5D shows a complete hollow MWCNT structure. FIG. 5E shows a bundle of MWCNT structures. FIG. 5F shows an MGNR structure.

FIG. 6A shows Raman spectra of pristine SWCNT and SWCNT transformed by 3000 cycles of the indicated voltage pulses. The order of the voltage conditions shown at the upper left is the same as the order of the spectra, from bottom to top. The signature peaks, including radial breathing mode, G, D, and G', are labeled on the figure. FIG. 6B shows variation of the source on time of each cycle and the emergence of a coalescence-induced mode (CIM) at an on time of 100 ms (off time was 400 ms and $V_a=0.8V_b$ for all conditions). FIG. 6C shows Raman spectra after 3000 cycles with variation of $V_a$ as indicated; the CIM was found at $0.8V_b$. FIG. 6D shows Raman spectra of material obtained after the indicated number of cycles at $0.8V_b$.

FIG. 7A shows the in situ two-terminal electrical resistance of SWCNT devices as a function of the indicated number of voltage pulse cycles and $V_a$. FIG. 7B shows the ratio of the integrated areas under the D and G bands for the indicated $V_a$ values from Raman spectra obtained before and after 3000 voltage pulse cycles. FIG. 7C shows the percentage device resistance drop after voltage pulse cycling at $0.8V_b$ for the indicated on times. The resistance drop was largest when the source on time was smallest. FIG. 7D shows the normalized resistance change (contact resistance subtracted, circles) as well as the thermal conductivity (squares) as a function of $V_a$.

FIG. 8A shows a scanning electron microscope image of a nanocarbon array transformed after 3000 cycles of $0.8V_b$ (scale bar 200 nm). FIG. 8B shows high magnification TEM image (scale bar 1 nm) showing a lattice structure consistent with sp$^2$ carbon; the inset shows the fast Fourier transform pattern. FIG. 8C shows the carbon K-edge energy loss spectrum obtained from the center (upper spectrum) and edge (lower spectrum) of the sample shown in FIG. 8A; the arrow indicates the appearance of sp$^3$ in the edge spectrum. FIG. 8D shows the Raman spectra of the pristine SWCNT (circles), the central region of the voltage pulsed material (spectrum with single large peak), and the edge region of the voltage pulsed material (spectrum with two large peaks). The percentage of sp$^3$ bonds was derived by comparing these spectra. The inset shows a red shift in the central region consistent with the formation of multi-layered sp$^2$ structures, and a 12.4 cm$^{-1}$ blue shift at the edges, corresponding to about 17% sp$^3$ structures.

FIG. 9A shows a composite material containing an matrix in which a two-dimensional network of interconnected nanocarbon material is embedded. FIG. 9B shows two-dimensional graphene sheets connected in the third dimension by aligned carbon nanotube networks.

DETAILED DESCRIPTION OF THE INVENTION

Figure 1:
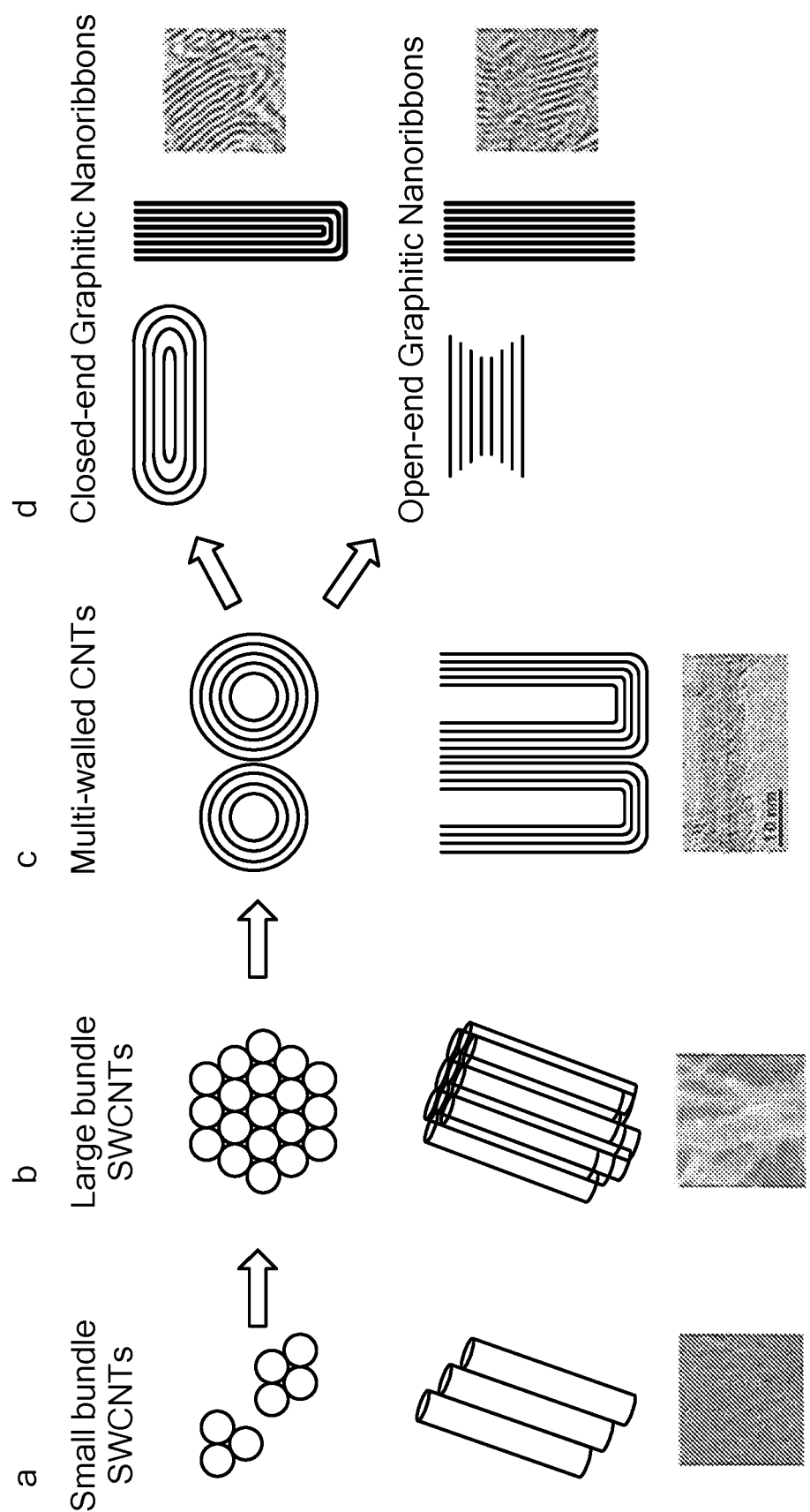
FIG. 1 shows a schematic illustration of the structural transitions in a method of the present invention whereby SWCNT are progressively converted into different allotropic forms of carbon.
Figure 2A:
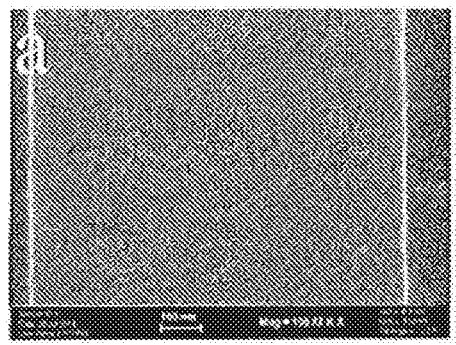
FIGS. 2A-2F show exemplary structures formed after electrical pulses were passed through the SWCNT network of the device depicted in FIG. 3.
Figure 2B:
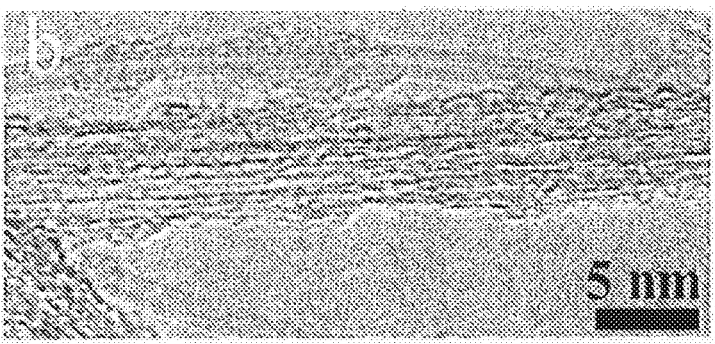
Figure 2C:
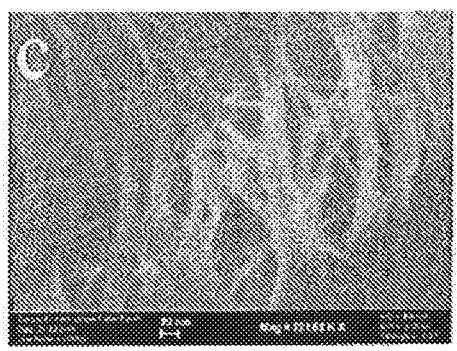
Figure 2D:
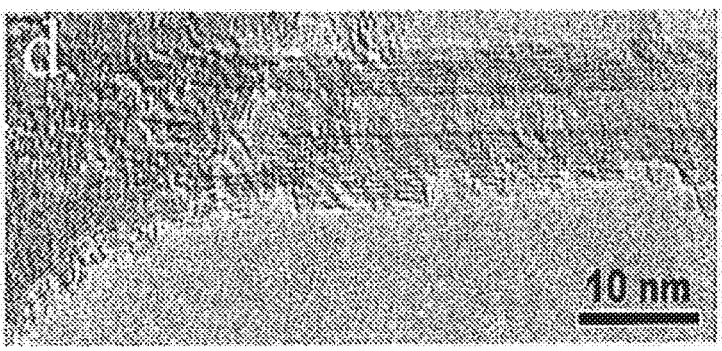
Figure 2E:
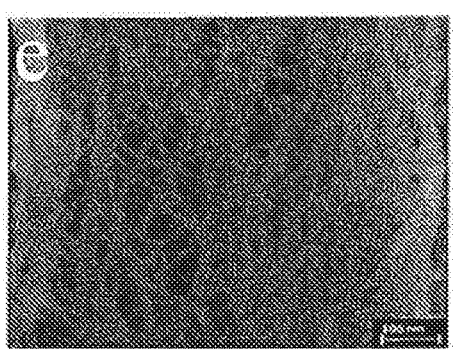
Figure 2F:
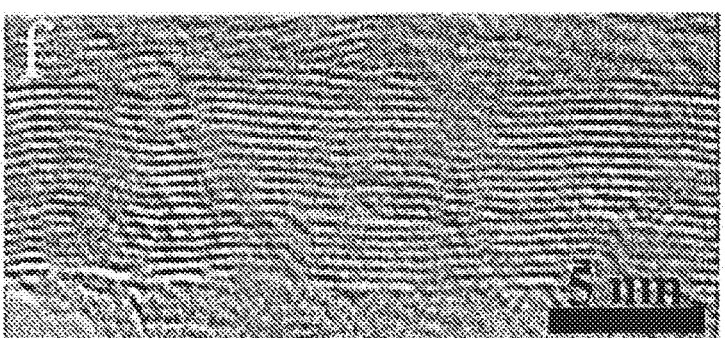

The present invention provides new carbon nanomaterials and methods for their fabrication. The materials are derived from aligned single-walled carbon nanotube (SWCNT) networks and are prepared using cyclical pulses of alternating voltage and mild heating conditions. The methods result in allotropic transformations across the carbon nanotube networks (i.e., from electrode to electrode) to form bundles of aligned SWCNT, enlarged diameter SWCNT, multi-walled carbon nanotubes (MWCNT), or multi-layered graphene nanoribbons (MGNR), or mixtures thereof. The transformation process can be controlled by electrical parameters including the amplitude, number of cycles, and duty cycle (on and off times) of alternating voltage pulses. Both open and seamless structures can be formed, and the frequency of structural defects is not increased during the transformational process. The invention also provides new materials for use in nanocircuits and microcircuits as well as new composite materials having superior electrical and thermal conductivity and new devices containing the materials.

Carbon nanotubes naturally align themselves into ropes bound only by van der Waals interactions, and these weak interactions limits their electrical and thermal conductivity in carbon nanotube networks. Thus, connecting connecting carbon nanotubes and constructing nanotube junctions with covalent bonds would significantly improve the physical properties of carbon nanotube films. Connecting of carbon nanotubes in a controlled manner also offers a promising approach for the bottom-up engineering of nanotube structures. The present invention produces new carbon structures by the controlled use of electrical power and the electron migration process. Morphology of small bundled SWCNT changes gradually into larger bundled SWCNT, MWCNT, and MGNR as the time of alternating voltage pulses is increased. After 3000 cycles at 36 mW, for example, the MGNR become the dominant form of carbon, as observed by high-resolution transmission electron microscopy (HR-TEM). The process is caused by the input of electric energy, low external heating, and the electromigration effect. By this controlled method, SWCNT or MWCNT can be modified simply into desired nanostructures directly in devices during their fabrication.

Previous attempts to convert carbon nanotubes into graphitic material such as nanoribbons have been essentially "spot welding" methods, using high heat treatments such as 800° C. and yielding only allotropic conversion over a region a few nm in size, or have used extreme heat conditions of 1600-2200° C. Unlike the present methodology, none of the prior approaches is compatible with device fabrication. The voltage pulses of the present invention utilize a combination of effects, including Joule heating over the entire nanotube, which provides thermal annealing of structural damage, and electromigration at junction points between nanotubes, leading to a rapid reshaping into defect-free graphitic layers.

The variety of structures produced by methods of the invention is depicted in FIG. 1, which illustrates how SWCNT are progressively converted to MGNR under appropriate conditions of voltage, voltage cycling, and temperature. The initial SWCNT network is initially composed of individual SWCNT non-covalently associated by van der Waals interactions. First, these SWCNT are converted to small bundles of SWCNT (see section "a" of FIG. 1), having a few SWCNT (e.g., 2, 3, 4, 5, 6, 7, 8, or 9 SWCNT) arranged in parallel along their axis and in close contact. Further energy input (e.g., higher applied voltage, $V_a$, during voltage pulse cycles) leads to the formation of large bundles of SWCNT (see section "b" of FIG. 1), having larger numbers of SWCNT (e.g., 10 or more, or 11, 12, 13, 15, or 20 or more SWCNT) in close lateral association along their length. Still further input of energy yields MWCNT having concentric layers of $sp^2$ carbon walls (e.g., 2, 3, 4, 5, 6, 7, 8, 9, or 10 or more layers), and usually having a hollow core. The MWCNT also may have closed end structures and/or incomplete outer wall layers. Finally, multilayerd graphitic nanoribbons (MGNR) are formed, which may have either open or closed end structures and edge structures. FIGS. 2A-2F show SEM and TEM images of the SWCNT, MWCNT, and MGNR structures formed by this process.

The allotropic transformation process of the invention starts with a network, array, or bundle of aligned carbon nanotube material, such as SWCNT, MWCNT, or carbon nanotube fibers (also referred to herein as "SWCNT or MWCNT network") disposed across a gap between two electrodes and in electrical contact with the electrodes. The carbon nanotube material can be transferred onto a nonconductive substrate material, such as silicon, silicon dioxide, or a non-conductive polymer material, for example. The electrodes can be metal layers, e.g., patterned by lithography, deposited on the substrate material. The SWCNT or MWCNT network and electrodes can optionally be part of a nanocircuit or microcircuit including additional components added either before or after the allotropic transformation of the SWCNT. The electrodes and the SWCNT or MWCNT network can have any form desired, such as rectangular, square, circular, or irregular. Preferably the SWCNT or MWCNT network and electrodes are two-dimensional shapes laid out on a planar substrate.

The aligned SWCNT or MWCNT network can be prepared by any known technique for assembling, depositing, and/or aligning carbon nanotube materials. A preferred technique is template-guided fluidic assembly (30-32), but other methods can be used, such as assembly by electrophoresis and/or dielectrophoresis. The network should have a high density that permits and promotes lateral interactions among neighboring nanotubes. For example, the density of the SWCNT or MWCNT network can be 5000, 10000, 15000, 20000, 25000, 30000, 35000, or 40000 or more SWCNT or MWCNT per $\mu m^2$ (square micron). A preferred density is 15000-25000 SWCNT or MWCNT per $\mu m^2$. A more preferred density is 18000-22000, or about 20000 SWCNT or MWCNT per $\mu m^2$ or higher.

Figure 3:
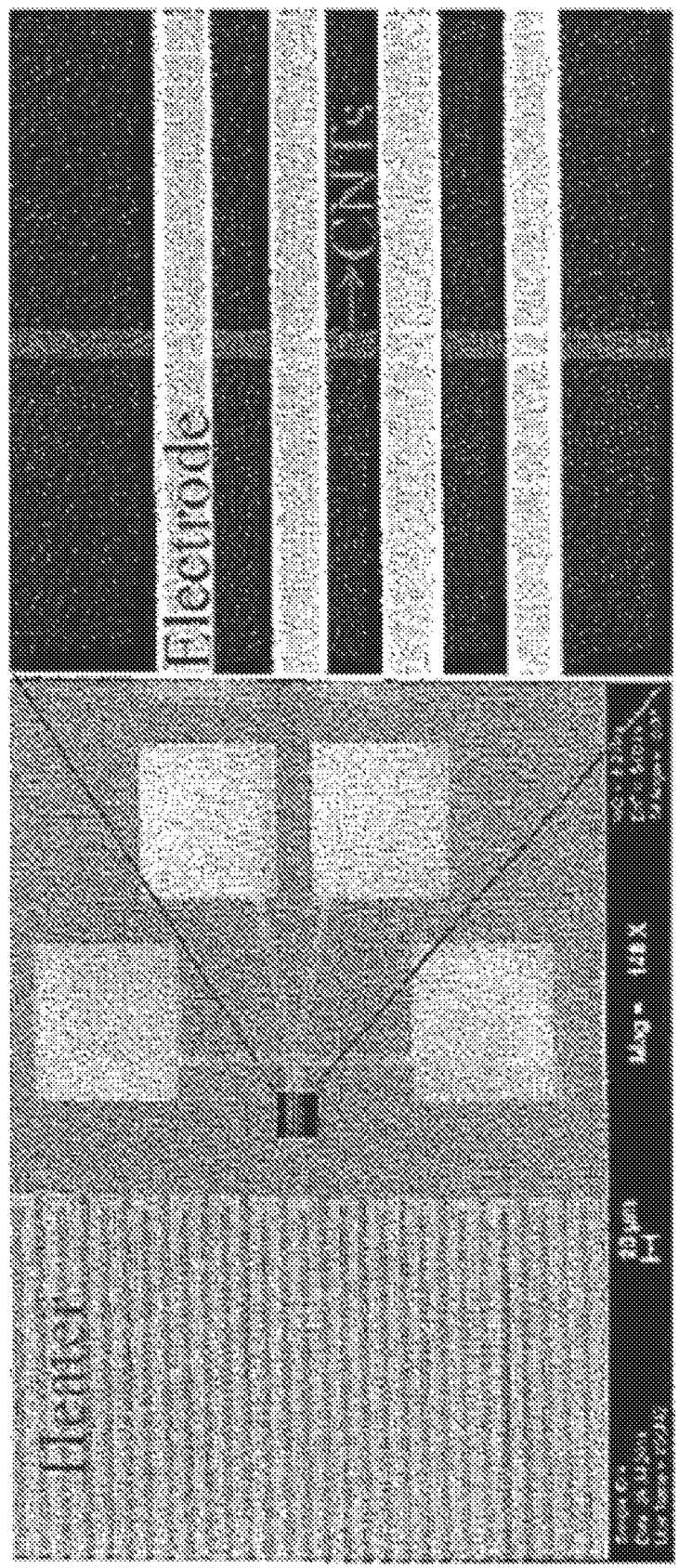
FIG. 3 shows an SEM image of a substrate used to investigate allotropic modifications of SWCNT as a function of voltage and temperature. The enlargement on the right shows a region of four horizontal electrodes of gold deposited on the insulating substrate and a single vertical band of SWCNT traversing the electrodes. Each electrode is electrically connected with a separate contact pad.
Figure 4A:
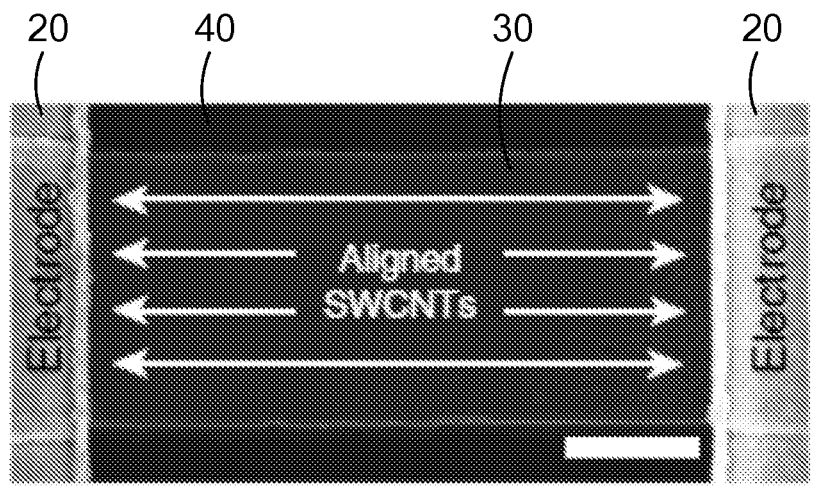
FIG. 4A shows a TEM image of a region of SWCNT aligned between two electrodes.
Figure 4B:
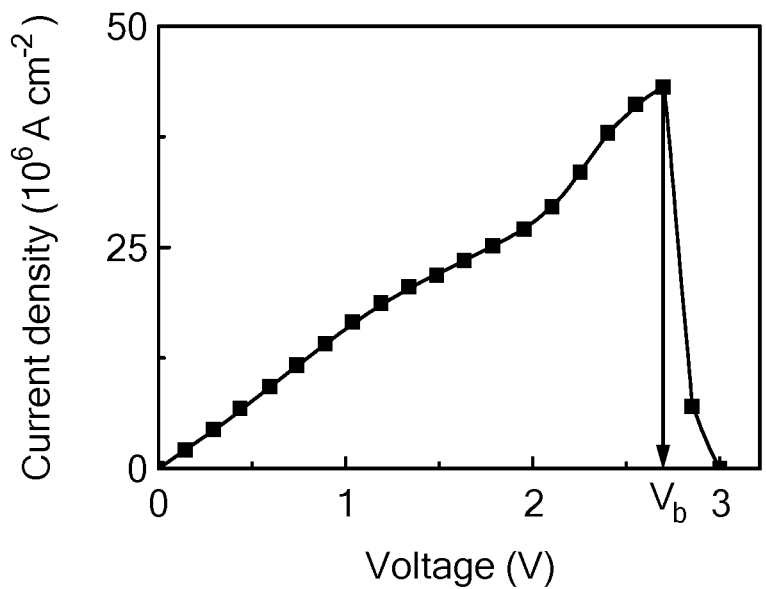
FIG. 4B shows a current-voltage relation for the aligned SWCNT network of FIG. 4A, including the breakdown voltage, $V_b$, at 2.7 volts.
Figure 4C:
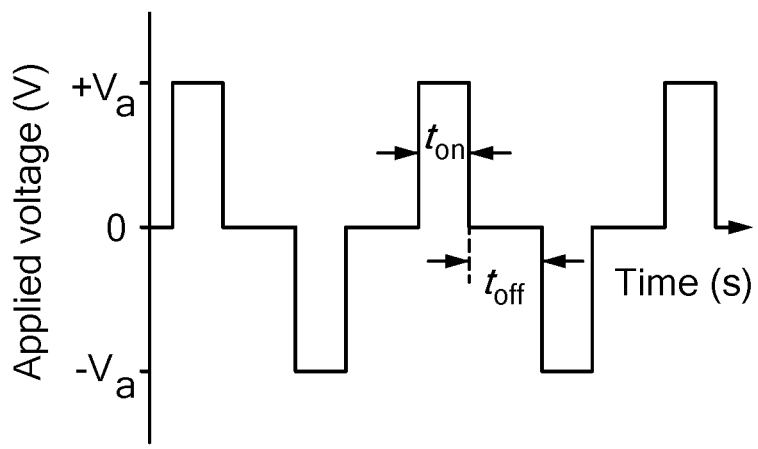
FIG. 4C shows a schematic illustration of a voltage protocol used to drive allotropic transformation of the SWCNT network of FIG. 4A.

FIG. 3 presents an SEM image of a specially fabricated device that allowed for TEM observation of the allotropic transformation process. Well-defined SWCNT microlines were directly assembled on specially designed TEM grids where microwindows were located between built-in microheaters for external heating. The device 10 shown in FIG. 4A includes an assembled SWCNT network microline 30 between two electrodes 20; the SWCNT network and electrodes are disposed on insulating substrate 40. Using the device, initial I-V characterization was performed to find the maximum current density ($J_b$) and the breakdown voltage ($V_b$) of assembled SWCNT networks under vacuum (FIG. 4B). Typically, the SWCNT arrays assembled on the TEM windows failed at current densities of a few tens of millions of A/cm$^2$ corresponding to values of $V_b$ between 2.5V and 3V. FIG. 4C shows the time-dependent alternating voltage pulses applied to the SWCNT networks. To initiate molecular junction formation and structural transformation in the SWCNT networks, the electrical polarity was switched periodically (typically at 1 Hz for 3,000 cycles) for several applied voltage amplitudes ($V_a$, FIG. 4C) ranging from 0.4$V_b$ to 0.8$V_b$, where the I-V curves turn slightly nonlinear (FIG. 4B) because of increased electron-phonon scattering and structural changes (33). The source-on-time ($t_{on}$ in FIG. 4C) for each $V_a$ was also varied to obtain the most effective transformation conditions.

Figure 5A:
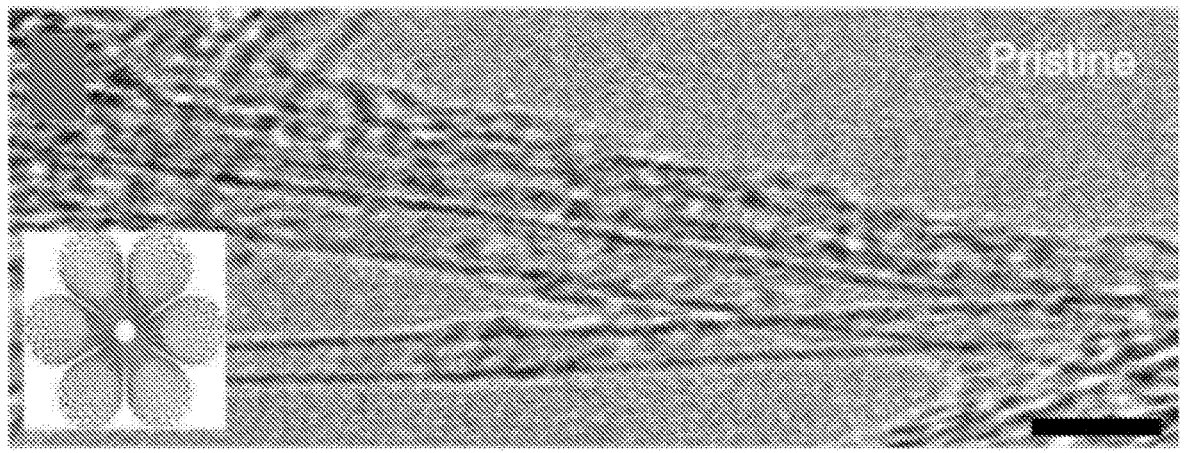
FIGS. 5A-5F show TEM images of different structures obtained by the method of the invention; an artistic rendering of a cross-section of the structures is presented in the inset to each image.
Figure 5B:
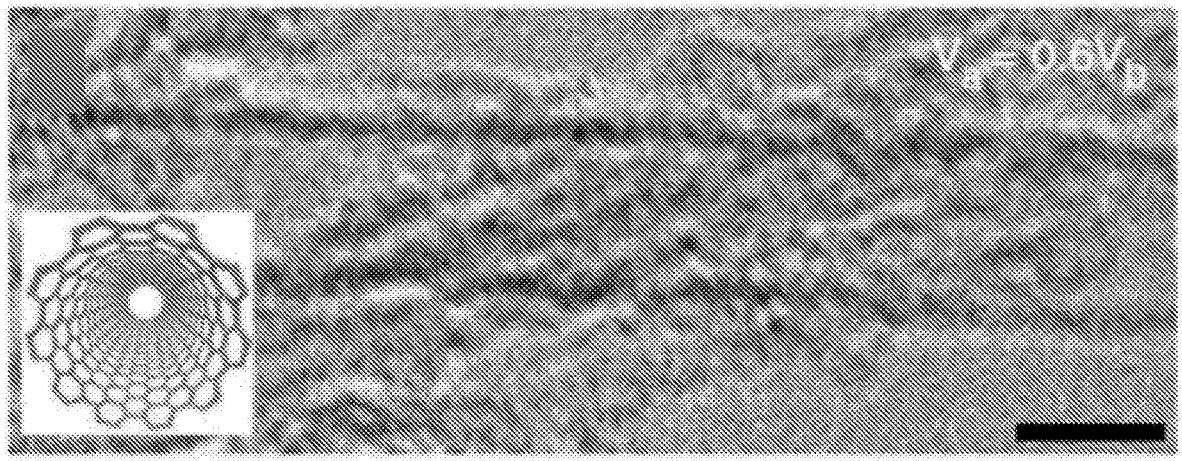
Figure 5C:
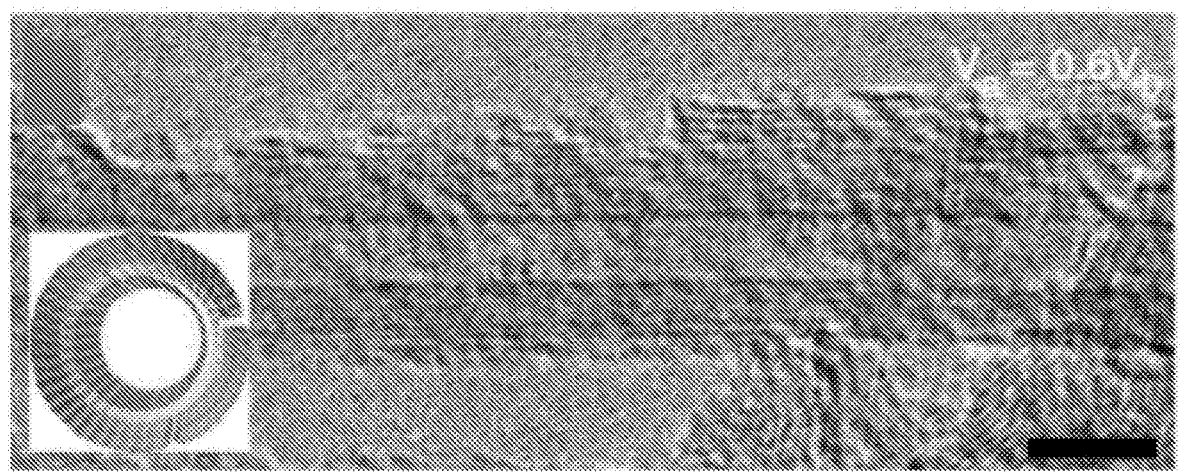
Figure 5D:
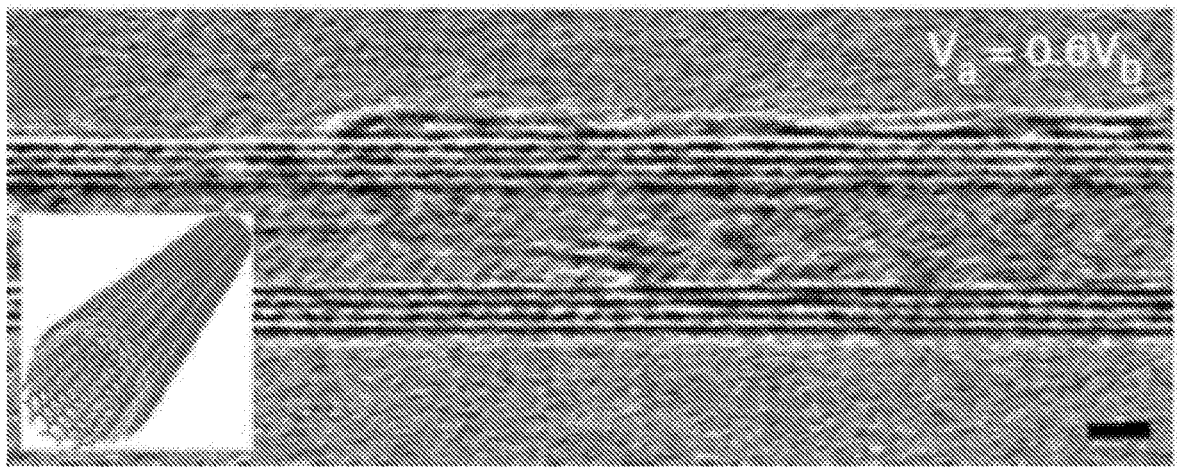
Figure 5E:
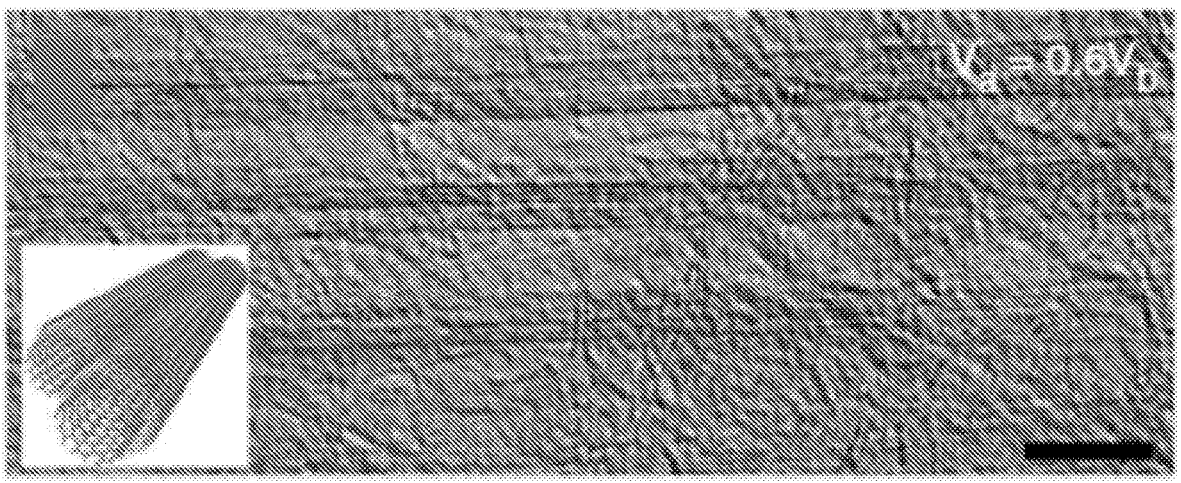
Figure 5F:
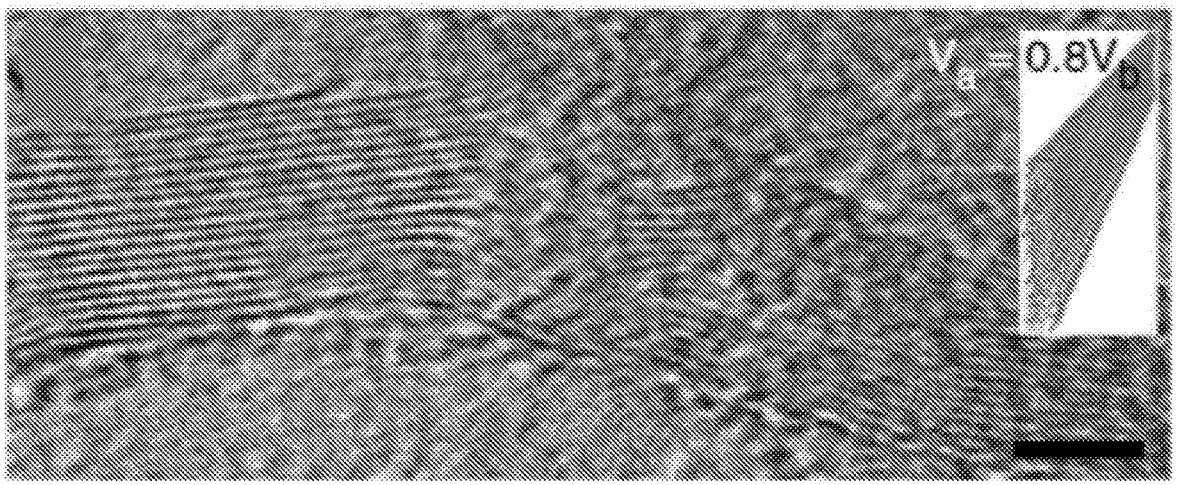

FIG. 5A shows a typical TEM image of the pristine SWCNT network (before electrical treatment) containing individual and bundles of SWCNT. FIG. 5B-F show TEM images showing representative results after the cycling steps were completed using the indicated values of $V_a$. Two different regimes were observed as the $V_a$ was increased. One is from 0 to 0.4$V_b$, where I versus V is linear and in which no significant structural changes occur. The other regime is from 0.4$V_b$ to 0.8$V_b$, where structural changes in the nanotube array take place along with active rearrangement of carbon atoms. Three different $sp^2$ carbon nanostructures were predominantly observed at the applied voltages of 0.6$V_b$ and 0.8$V_b$. At $V_a$=0.6$V_b$, a few of the SWCNT bundles coalesced to form few larger diameter SWCNT, as seen in FIG. 5B. However, under the same conditions, most of the SWCNT networks were transformed either to MWCNT arrays ranging from 15 to 30 nm in diameter with several incomplete $sp^2$ outer tube walls (FIG. 5C); which give rise to either dangling bonds and structural imperfections that may enhance the coalescence of CNTs (14,20,25, 34-37) or to well-defined MWCNT with hollow cores and completely formed tube-wall (seen as straight lattice fringes in FIGS. 5D and 5E). For $V_a$=0.8$V_b$, multilayered and flattened graphitic structures were most commonly observed (FIG. 5F), probably resulting from larger diameter single- or few-walled nanotubes gaining stability by collapsing into MGNR. These results represent the typical observations from over 500 different devices tested.

The structural transformation was observed uniformly across the entire SWCNT network. This is because individual nanotubes were aligned into narrow (approximately few nanometer) bundles because of coherent capillary forces they undergo during the fluidic assembly process (30). Further, during the initial cycles of voltage-pulsing, randomly oriented SWCNT bundles were observed to form larger (approximately tens of nanometers) and more stable and aligned bundle configurations. A narrow adjacent distance between nanotubes promotes the hexagonal lattice packing of SWCNT into larger bundles and to eventually form a bundled rope. Each pair of nanotubes in this arrangement has almost the same probability of forming a coalescence transformation as the voltage is increased. The dense mechanical alignment of SWCNT in the initial phase of voltage-pulsing placed each of the nanotubes in intimate contact with its neighbour—a necessary prerequisite for efficient coalescence of the nanotubes. Most of the energy given to the system for values of $V_a$ up to $0.4V_b$ is believed to be used in a search towards better alignment of the nanotubes and the enlargement of SWCNT bundles without changing their structure. Beyond this voltage ($V_a$=0.4V), the original $sp^2$ bonds undergo a massive rearrangement, accompanied by the rise of strong coalescence-induced modes (CIMs) in the Raman spectra, which is a signature precursor for inter-tube coalescence (13,38-40).

Figure 6A:
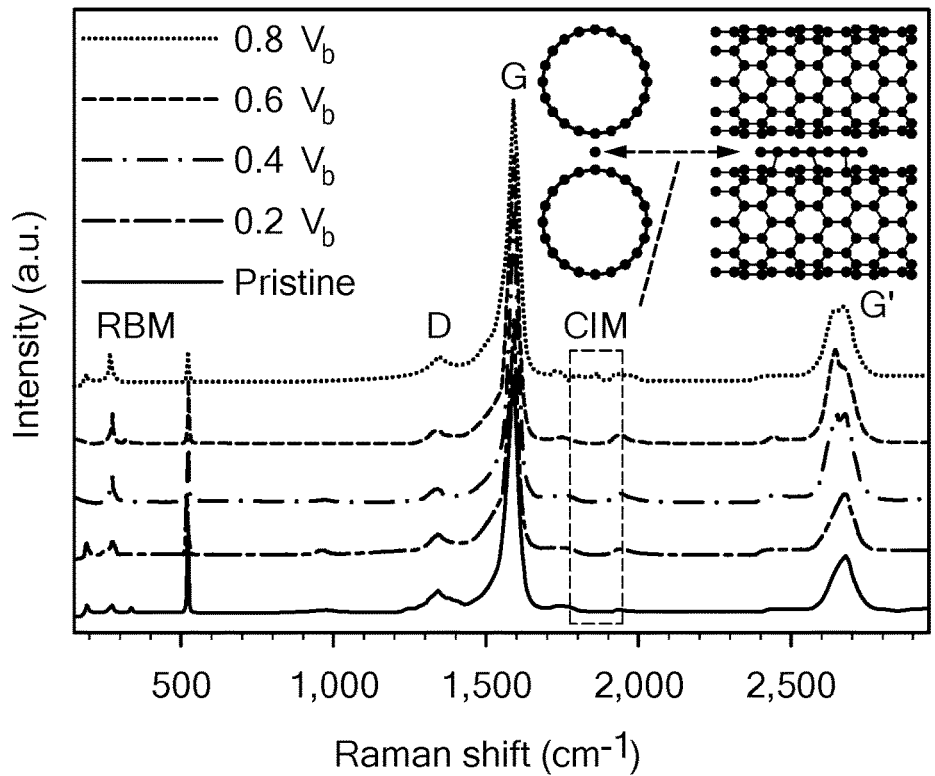
FIGS. 6A-6D show Raman spectra obtained from an aligned network of SWCNT under the stated conditions of voltage pulsing.

Raman spectroscopy measurements were performed at the same location in the SWCNT network before and after subjecting the sample to various voltages from $0.2V_b$ to $0.8V_b$. Shown in FIG. 6A are overall Raman spectra showing four representative Raman features: the radial breathing mode, the D-band, the G-band and the G'-band, each representing unique spectral evolutions, not previously observed, as the applied voltage was increased. In the same figure, the expected location of a fifth emergent feature, the CIM (13,38-40), is indicated with a dashed rectangle. The CIM is a unique identifier of vibrations of linear carbon chains "H—$C_n$—H", and depending on "n", the length of the chain is expected to result in Raman modes around $\omega_{CIM}$=1,850-1,900 cm$^{-1}$. The CIMs provide a confirmation that carbon atoms in the nanotube lattice are migrating to form different $sp^2$ carbon structures that are mediated via the temporary appearance of junctions in the form of linear C-chains between adjacent nanotubes (13,38-40) as shown schematically in the inset of FIG. 6A. These modes have been determined to be a precursor to the coalescence process in high-temperature-induced coalescence of nanotubes (38).

Figure 6B:
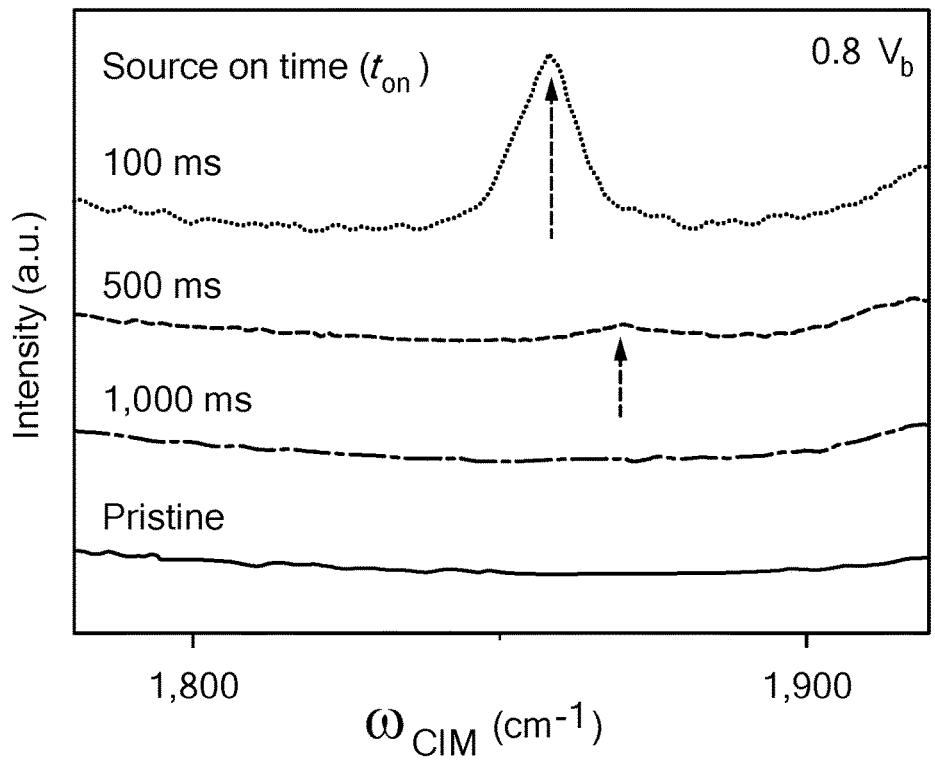

Interestingly, for voltage-pulse-induced coalescence, the CIM modes are more prevalent when the pulse duty-cycle ($t_{on}/(t_{on}+t_{off})$) is smaller. This fact is illustrated in FIG. 6B, which shows typical Raman spectra near the CIM mode for samples that have been cycled using different on times, $t_{on}$ (keeping $t_{off}$ constant at 400 ms). As $t_{on}$ decreases, CIM modes (demarcated by arrows in FIG. 6B) began to appear at $t_{on}$=500 ms, being most prominent at $t_{on}$=100 ms. The disappearance of CIM modes for larger $t_{on}$ values implies that rapid switching of the voltage pulse is a more effective method to obtain the transformations.

Figure 6C:
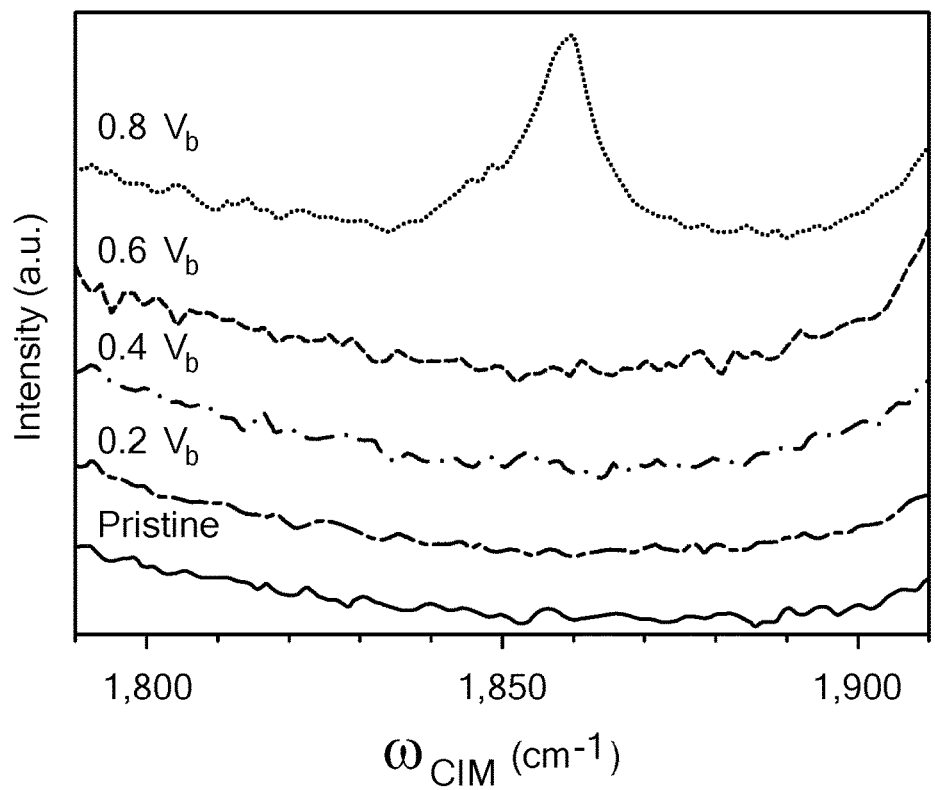

Selecting $t_{on}$=100 ms, the evolution of the CIM peak was studied in a large number of samples subjected to different $V_a$ at various cycling stages. As the voltage cycling proceeds, the CIM modes were found to appear and often disappear in most samples, which is consistent with the fact that the linear carbon chains are intermediate steps during the transformation of SWCNTs into more complex structures. At $V_a$=$0.8V_b$, the CIM peaks were found to be present even after 3,000 cycles, implying that at this high voltage, the transformations were much more large-scale, and within the experimental cycling-range, partially complete. This typical observation has been illustrated in FIG. 6C, which shows that at the end of the 3,000 cycles, a prominent CIM remained around $\omega_{CIM}$=1,855 cm$^{-1}$ for samples cycled at $V_a$=$0.8V_b$.

Figure 6D:
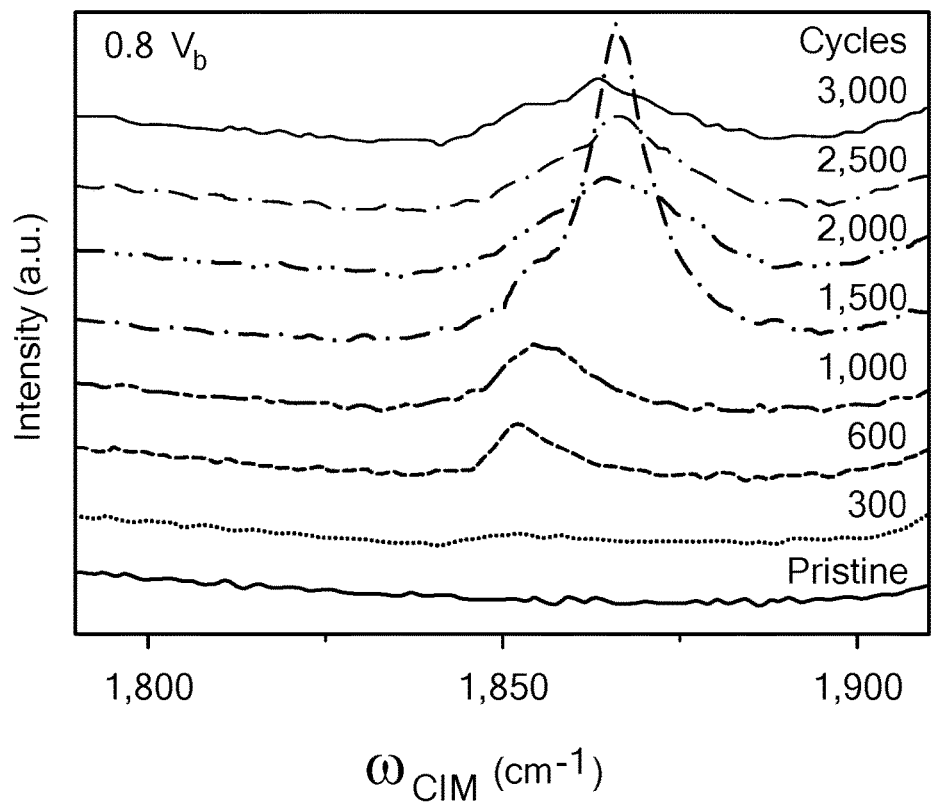

The appearance of the CIM mode correlated with detailed TEM-based inspection of the samples that had been cycled at various values of $V_a$. For samples cycled at $0.4V_b$ and below, where the CIM never showed up, no major structural changes were observed in TEM images. When cycled at $0.6V_b$, which resulted in various MWCNT morphologies (FIG. 5B-5E), the CIM spectral feature appeared intermittently at different cycling stages, for example, at 600 and 2,500 cycles. However, at $0.8V_b$, where a highly active structural transformation occurs, the CIM appeared consistently throughout the entire cycling stage, as shown in FIG. 6D.

Figure 6E:
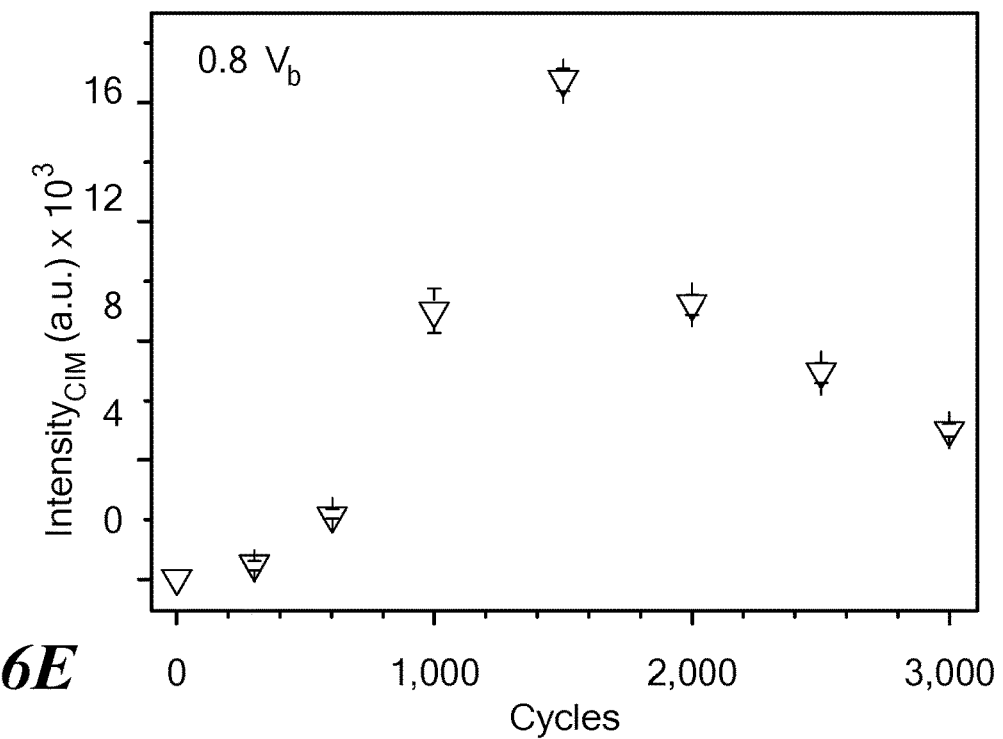
FIG. 6E shows a plot of the size of the CIM peak as a function of the number of voltage cycles; the peak was at 1500 cycles. Error bars show standard deviation.

A clear trend of the rate of structural transformations emerges when the CIM peak intensity ICIM is plotted as a function of cycles, as seen in FIG. 6E. ICIM grew steadily with increased voltage cycling, and exhibited a clear peak, at about 1,500 cycles beyond which the rate of structural transformations gradually slowed down, indicating that the structural transitions were largely complete. Hence, this cycle dependence along with the $t_{on}$ dependence enabled identification of the most effective electrical conditions for transforming SWCNT networks into the various $sp^2$ nanostructure SWCNT networks that occur from $0.5V_b$ to $0.8V_b$ voltages.

Figure 6F:
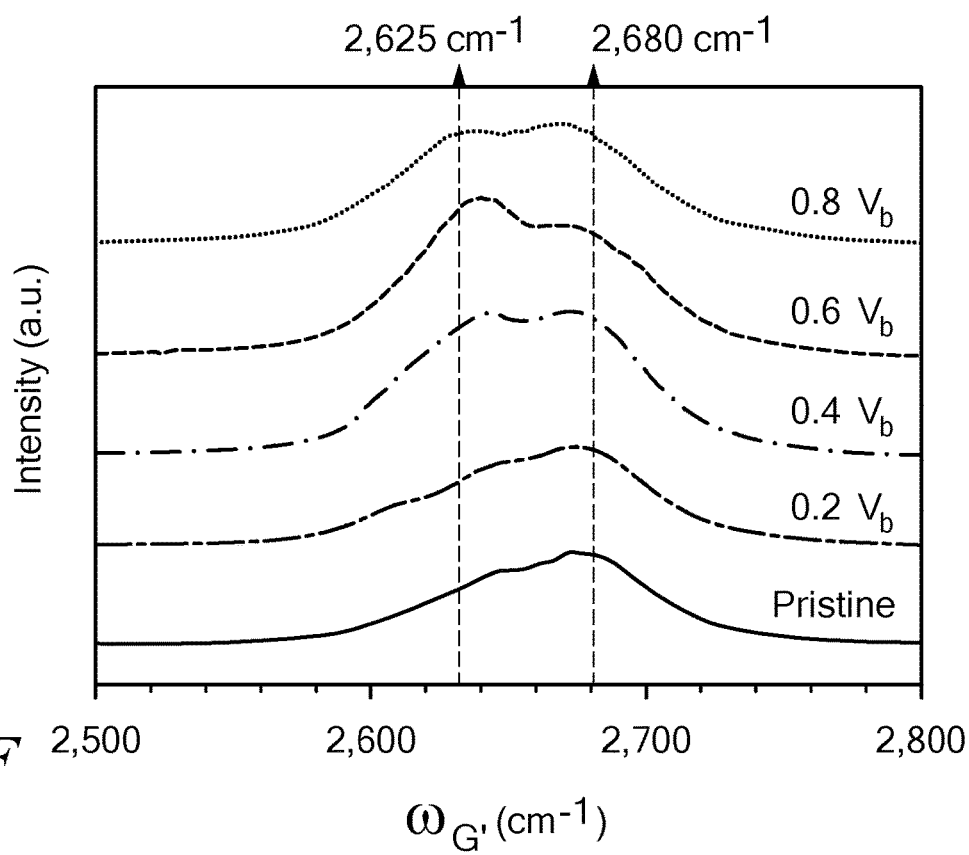
FIG. 6F shows the evolution of the G' peak as a function of $V_a$. The low-frequency peak at $\omega=2,625$ cm$^{-1}$ indicated appearance of large-diameter SWCNT or MWCNT. All spectra were obtained using a 532 nm laser line (2.33 eV).

In addition to the CIM, the evolution of the G'-band of the nanotubes before and after voltage cycling was investigated. FIG. 6F shows the line-shape and intensity change in the G'-band spectra after electrical treatment with different applied voltages. The average peak position of the G'-band is known to red-shift to lower frequencies with increasing mean nanotube diameter (41). In addition to the pristine G' peak with a maximum around 2,680 cm$^{-1}$, the clear emergence of a red-shifted peak centered around 2,625 cm$^{-1}$ was observed after voltage cycling, consistent with the coalescence of small diameter SWCNT, which forms bigger diameter SWNT/MWNT, and the collapse of MWCNT into their layer-stacked MGNR counterparts.

Figure 7A:
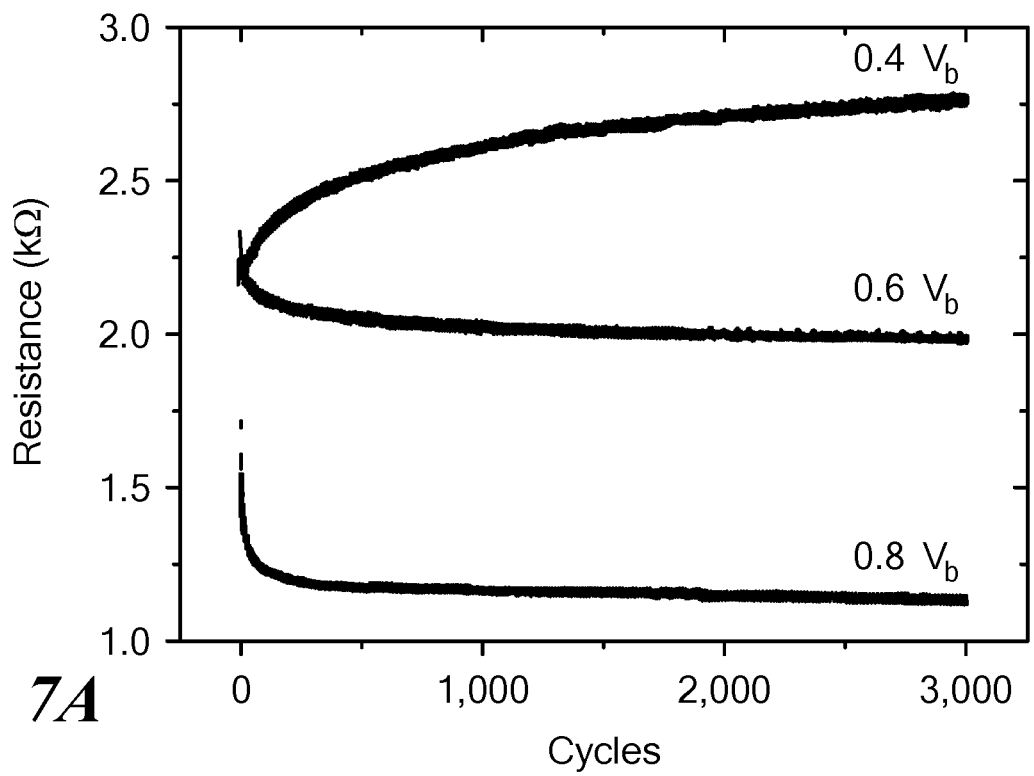
FIGS. 7A-7D show electrical and thermal properties of the allotropic carbon forms produced by the method of the invention.
Figure 7B:
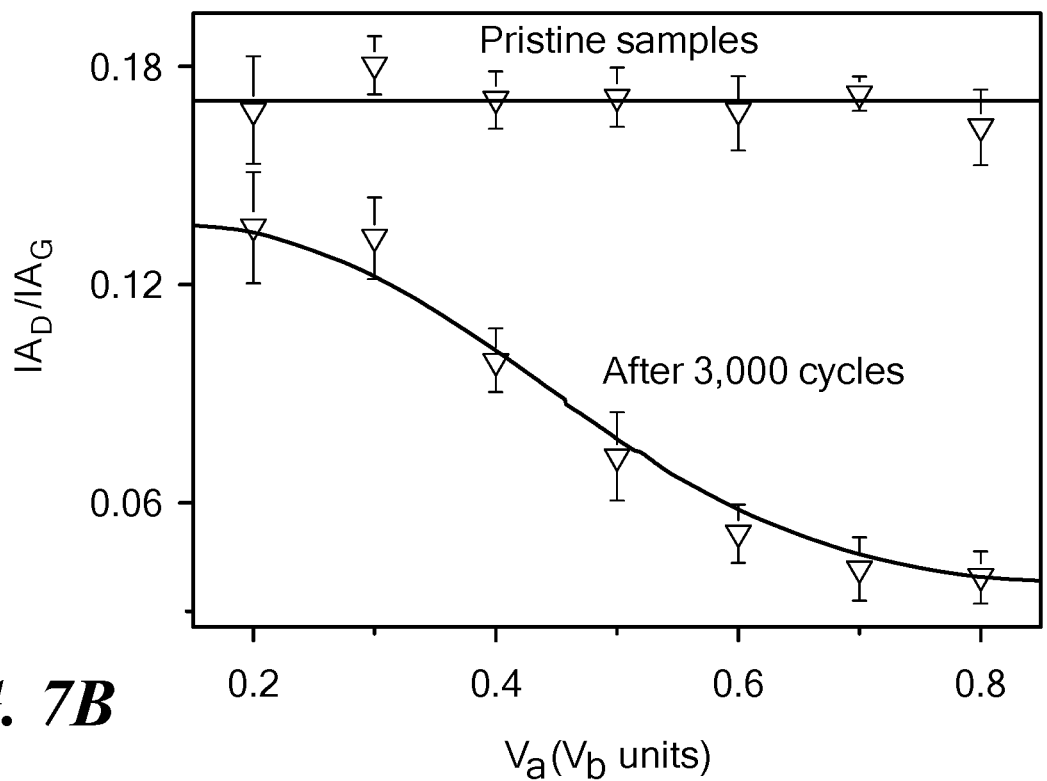

In-situ two-terminal electrical resistance changes in SWCNT devices were measured during the entire transformational process, as such data are indicative of successful junction formation and structural evolution. Analysis showed that contact resistances play only a small role in the overall changes. FIG. 7A shows the resistance change as a function of the number of cycles at alternating voltage pulses of $0.4V_b$, $0.6V_b$ and $0.8V_b$, respectively. For samples cycled at $V_a$=$0.4V_b$, the electrical resistance was seen to increase slowly over time over the entire cycling period. Since neither TEM nor Raman investigations indicated any structural transformations at this $V_a$ value, and analysis of the D-band of Raman spectrum (FIG. 7B) showed a decrease in defect density, it is believed that at this voltage, the nanotubes may undergo small mechanical alignment changes that alter the conductive pathways. With increasing $V_a$, however, there was a complete trend-reversal, with the overall resistance decreasing with increasing voltage cycles, commensurate with the increasing inter-nanotube junction formation, as well as significant increase in diameter and wall-thickness of the conductive structures. The decreasing electrical resistance because of voltage cycling is also consistent with the steady decrease of defect density in the structures after voltage cycling was completed. This fact is brought out in FIG. 7B, which shows the variation of $IA_D/IA_G$ (ratio of the integrated areas of the D and G bands) as a function of $V_b$. The results clearly show a sizeable decrease in $IA_D/IA_G$ with increasing $V_a$, indicating that the network is getting relatively less defective (relative decrease of D-band intensity) and more organized by forming more ordered $sp^2$ carbon nanostructures (relative increase of G-band) after the transformational process.

Figure 7C:
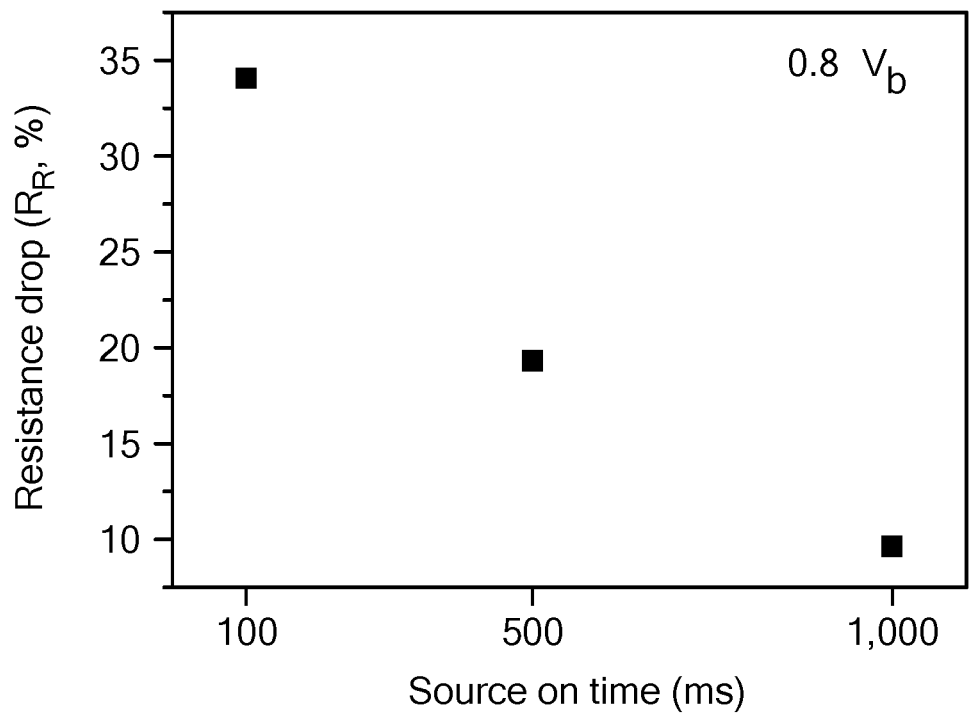

FIG. 7C shows the percentage drop in post-cycling resistance as a function of $t_{on}$ in a sample cycled 3,000 times with $V_a$=0.8 V. The electrical resistance drop was found to be largest when the duty-cycle was smallest, which is in direct agreement with the $t_{on}$-dependent appearance of the CIM (FIG. 6B), suggesting that rapid pulse-switching (when $t_{on}$ is small) rather than prolonged Joule-heating (when $t_{on}$ is large) better assists in the transformation processes.

Figure 7D:
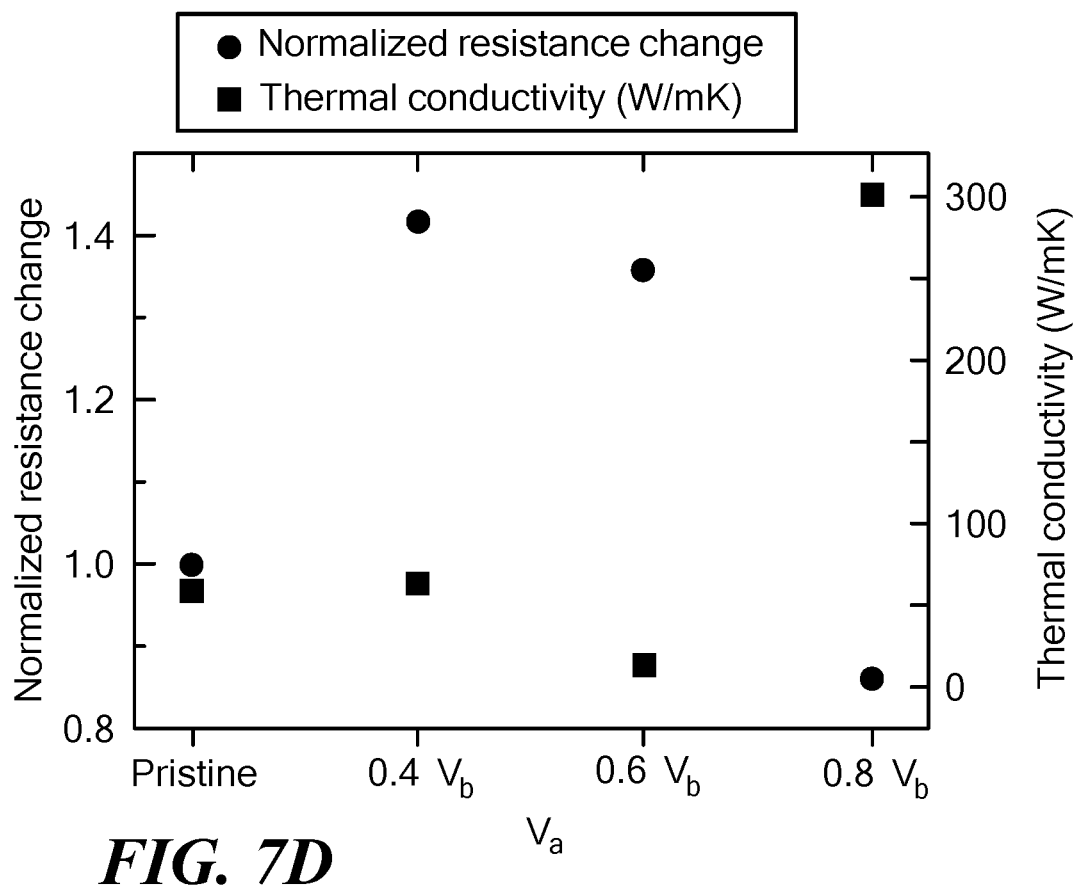

FIG. 7D shows the variation of the electrical resistance and thermal conductivity in SWCNT networks as a function of $V_a$ (contact effects were removed). Particularly, when $V_a$=0.8$V_b$ was applied for 3,000 cycles, both the electrical contact resistance (metal electrodes-SWCNT) and intrinsic network resistance decreased because of the formation of electrically stable metal-nanotube interfaces and restructured $sp^2$ nanocarbon networks. At the same time, the post-cycling thermal conductivity was found to gradually decrease from about 60 W mK$^{-1}$ to about 10 W mK$^{-1}$ up to $V_a$=0.6$V^b$. For $V_a$=0.8$V_b$, however, there was a dramatic increase in thermal conductivity, reaching values of about 300 W mK$^{-1}$, which is five times higher than that of pristine SWCNT networks. The sharp drop in the network electrical resistance and dramatic increase in its thermal conductivity when voltage-pulse cycled at $V_a$=0.8$V_b$ was accompanied by a rather unexpected finding—the appearance of $sp^3$-hybridized carbon in the network.

Figure 8A:
FIGS. 8A-8D show evidence for the emergence of sp$^3$ structure.
Figure 8B:
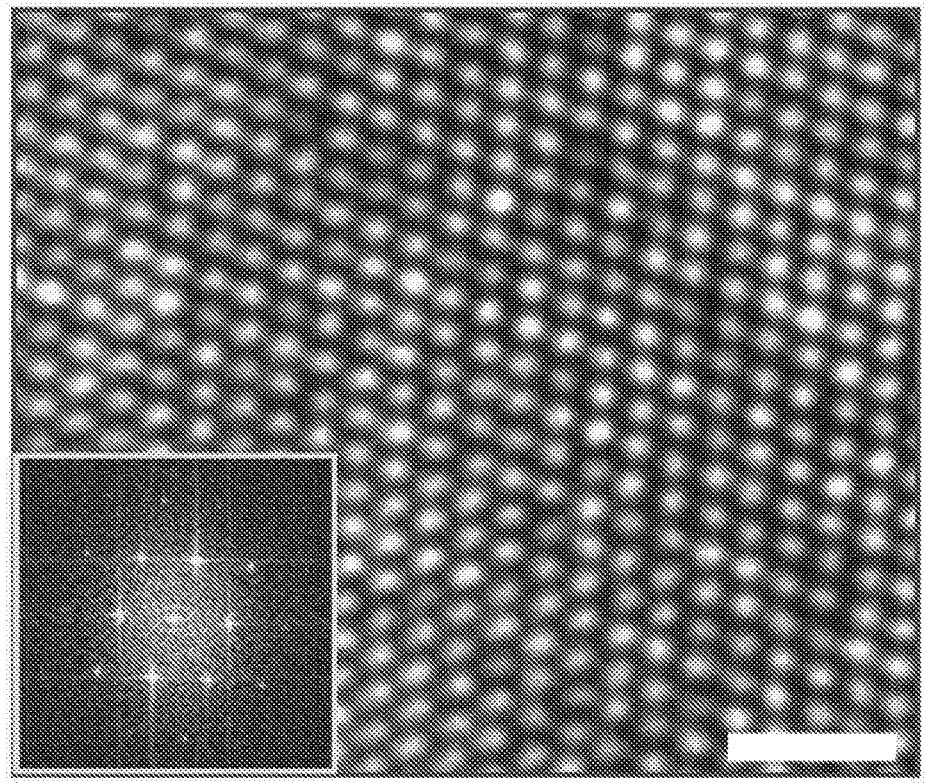
Figure 8C:
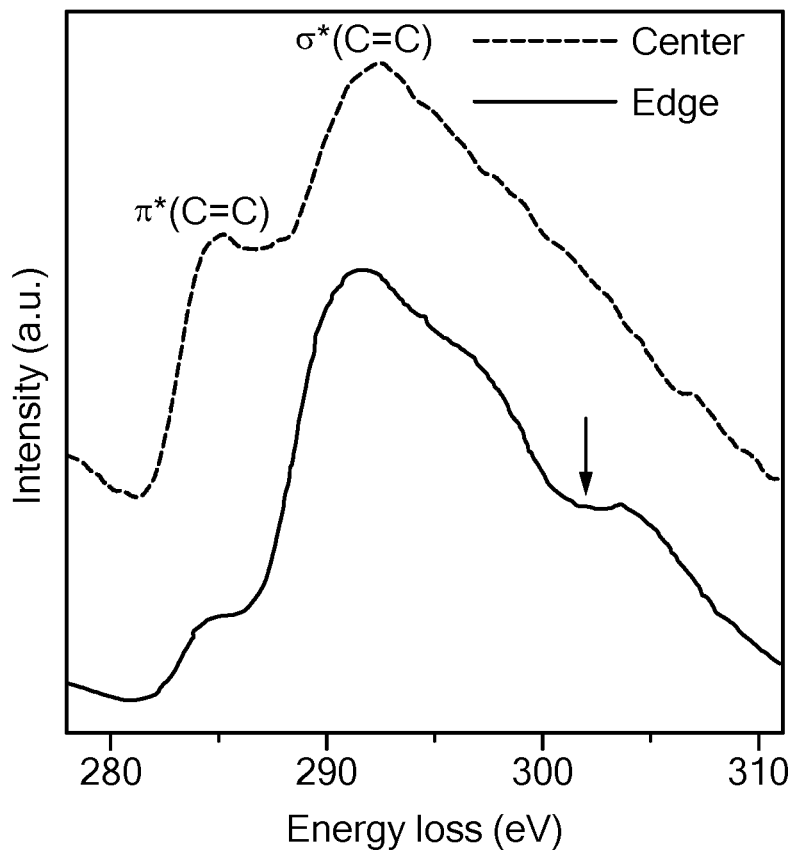
Figure 8D:
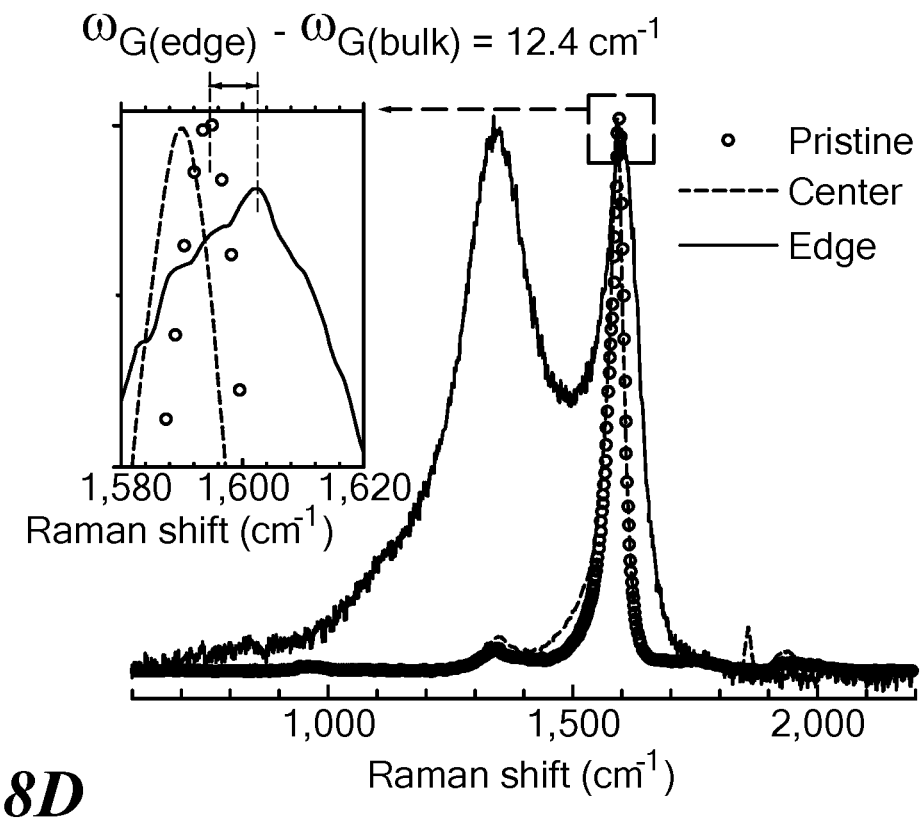
Figure 9A:
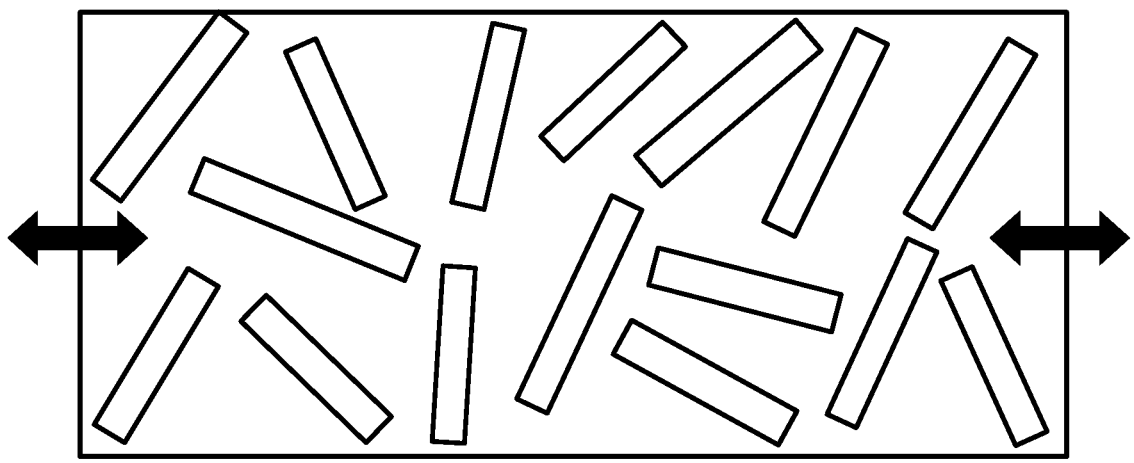
FIGS. 9A and 9B show schematic illustrations of materials that can be fabricated using methods of the invention.
Figure 9B:
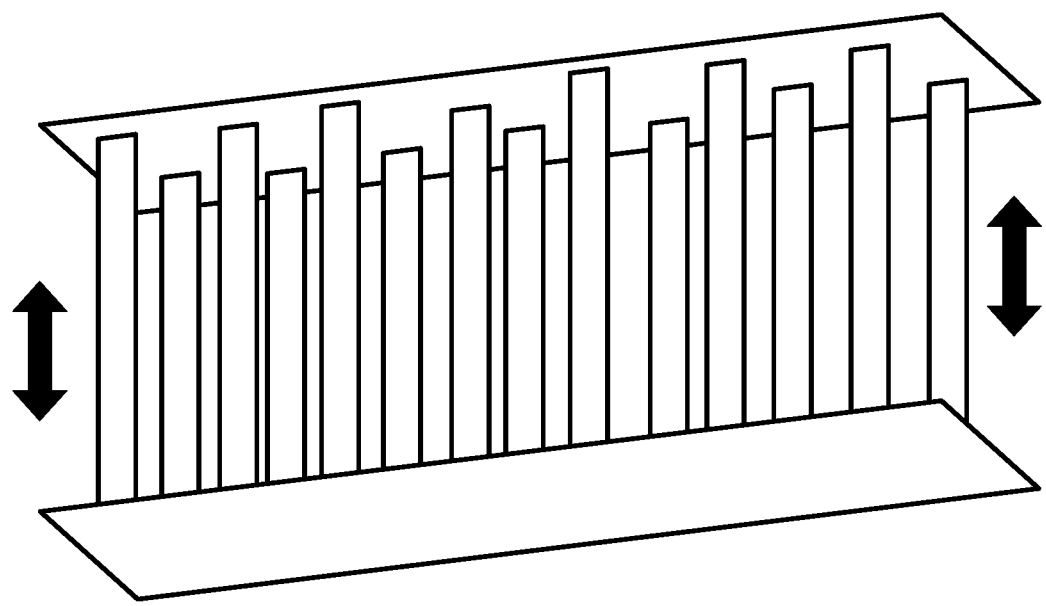

FIG. 8A shows an SEM image of the network structure after being cycled at 0.8$V_b$. High-resolution TEM image of the central portion of this structure (FIG. 8B) reveals that the transformed network consists of a multi-layered graphitic sp2 structure. The measured in-plane lattice spacing in the center was 0.24±0.02 nm, which is identical to the $sp^2$ carbon structure (24). However, carbon K-edge energy loss spectrum (EELS) and resonant Raman spectroscopy results that compare the central region versus the edges of these networks revealed that at the edges the network was transformed to $sp^2$-$sp^3$ hybrid nanostructures. In FIG. 8C, the EELS spectra from the center and the edge regions of the sample shown in FIG. 8A are compared. In general, $sp^2$ bonds exhibit a peak around 290 eV because of s* states and the other peak appears at 285 eV corresponding to p* states (42-44), as seen in the spectrum measured from the center of the sample. However, the EELS spectrum measured at the edges shows clear signatures of $sp^3$-type carbon: a s* edge around 290 eV corresponding to the $sp^3$ transition 1s-2s* (45) and a dip around 302 eV that corresponds to the second absolute band gap characteristic of the crystalline $sp^3$ structure (46,47). Further, the $sp^2$ carbon band at about 285 eV became a very shallow shoulder in the spectrum of the $sp^3$-bonded carbon. The relative G-band shift in Raman spectra focused on two different locations, center and edges of the transformed network (FIG. 8D), was used to estimate the percentage abundance of $sp^3$ carbon. The Raman spectra, taken at the center of networks, zoomed into the G-band range (inset in FIG. 8D) indicate that this transformed network kept mostly crystalline $sp^2$ bonds. However, at the edges, Raman spectrum shows the characteristics of a nanocrystallization of the pristine material with highly disordered $sp^2$ bonds (amorphization) and the rise of some $sp^3$ bonds. The contents of $sp^3$ bonds (in %) at the edges can be calculated with the relation (48):

$$sp^3(\%) = 0.24 - 0.0049 * (\omega_{G(edge)} - \omega_{G(center)}),$$

in which $\omega_{G(edge)}$=1,602.4 cm$^{-1}$ and $\omega_{G(center)}$=1,590 cm$^{-1}$ stand for the G-mode Raman frequency at the edges and in the center of the resultant material. According to this expression, there are about 17% of $sp^3$ bonds at the edges (as annotated in FIG. 8A). As shown in FIG. 8A, nanotubes in both edges are more highly aligned because of the capillary force-induced assembly of SWCNT (30,32). Highly excited electrons for $V_a$=0.8$V_b$ constantly transfer their energy to the nanotube lattice. Especially for the highly aligned SWCNT arrays at the edges of the network, a more effective rearrangement of carbon atoms can potentially occur along the compact and aligned nanotube lattices, leading to the apparent formation of the $sp^3$ structures. Therefore, it is assumed that reduced junction scattering and increased thermal conduction pathway through the $sp^3$ carbon structure might cause the high thermal conductivity in this network.

Several factors could contribute to the mechanism driving the observed allotropic transformations. The first is Joule heating. The instantaneous local temperature of the SWCNT because of periodic voltage-pulse cycling could reach up to 1,200K at $V_a$=0.8$V_b$, and thermally induced changes in $sp^2$ carbon structures are usually negligible at such temperatures (28). Moreover, the transformations are more effective under rapid voltage-switching (smaller values of $t_{on}$) rather than higher heat-generating (larger values of $t_{on}$) cycles. This indicates that Joule heating alone is not sufficient to explain the transformation process. Second, the formation of bundles and the resulting densification of SWCNT at the initial stages of cycling indicate that the applied voltage-pulses induce coherent mechanical forces that move nanotubes closer to each other. However, although these forces can move the nanotubes into intimate proximity, they alone are not likely to trigger the entire coalescence phenomenon. A third factor is the role of electromigration in triggering the transformations (24,25,49). At high current densities, electrons can transfer significant momentum to atoms causing them to migrate from their parent sites, and such migration events rapidly grow in number at elevated temperatures. However, the effectiveness of electromigration alone in driving the entire sequence of transformations is difficult to quantify. It is likely that a combination of all these above effects may be playing a role in bringing about the allotropic transformations. The nanoscale forces that initially align the nanotubes bring them to van der Waals proximities. Thermal fluctuations and electromigration may cause these atoms to move out of their lattice sites, and these mobile atoms minimize their energies by forming linear chains between two SWNCTs (FIG. 6A) that forms a junction between nanotubes and gives rise to the CIMs in Raman spectroscopy. With continued cycling, the junction grows wider and eventually becomes comparable in size with the nanotube diameters and the nanotubes release mechanical strain by coalescing into larger-diameter structures.

The engineered carbon structures that can be produced with the present invention allow the full electrical and thermal conductivity of graphene to be realized for use in interconnects for high speed nanoscale electronics and nanomechanical devices.

EXAMPLES

Example 1

Fabrication of a Highly Aligned SWCNT Network

One method of preparing an SWCNT network suitable as starting material for a method of the invention is described by way of example. The basic steps for building organized SWCNT lateral architectures fabricated using the template-guided fluidic assembly process (30-32), were as follows. First, a 300-nm-thick polymethyl methacrylate photoresist was deposited on a substrate and baked at 160° C. for 90 s. Second, polymethyl methacrylate patterns were constructed on the substrate using electronbeam lithography to build nanoscale channels, which form templates for building the test architectures and these templates were then developed in the solution (methyl isobutyl ketone/isopropyl alcohol=1:3) for 100 s followed by a 30-s rinse in isopropyl alcohol solution. Next, these template substrates were dip-coated in a 0.23 wt % high-purified SWCNT solution at a constant pulling rate of 0.1 mm/min. The dip-coating processes result in stable and densely aligned SWCNT lateral network architectures on the substrate having well-defined shapes at the nanoscale. Finally, the photoresist was removed to obtain well-organized and aligned SWCNT lateral networks.

For the fabrication of contact electrodes, consisting of Ti(5 nm)/Au(150 nm), the same fabrication steps were applied, except for the dip-coating process described above.

The SWCNT density in the network array was estimated as follows. The networks made from dip-coating techniques typically have small surface roughness and close-packing structures with 80% dense SWCNT. The cross-sectional area is approximately 18,000 nm²±3,000 nm². Therefore, the number of SWCNT in the network of 2 mm² dimension is calculated as about $(4\pm0.5)10^4$ $((2\pm0.25)10^{12}$ cm$^{-2})$.

Example 2

Allotropic Transformation of SWCNT Network

A Keithley 2,400 sourcemeter was used to apply voltage and to measure the resistance across the two terminal SWCNT devices. All the measurements were done under high vacuum (P<$10^{-5}$ Torr) in a Janis Research ST-500 cryogenic probe station to reduce radial heat losses through gas convection and to avoid burning the devices. Voltage sweeps were applied through SWCNT arrays to find the breakdown voltage. Most of the arrays failed at a maximum current density of about $4.3\times10^7$ A/cm², and the breakdown voltage ($V_b$) was 2.7V on the TEM window (FIG. 4B). By sweeping the voltage over a suitable range, a critical voltage was observed for which the graphitization process was accelerated. At the same time, applied voltages too close to $V_b$ often led to the breakdown of the nanotube. Therefore, $V_b$ for these quasiparallel SWCNT networks was found to be an important parameter.

The $V_b$ in fabricated devices could be predicted statistically by $V_b=-2.14\ I_{1v}+9.13$. Here $I_{1v}$ [mA] is the current at 1 V. Arrays with a nearly similar current density were used for testing the reproducibility of the transformation process. For the structural engineering of the SWCNT arrays, repetitive positive and negative voltages of $0.4V_b$, $0.6V_b$ and $0.8V_b$, for which the electrical powers were in the range of 2-3, 6-8 and 10-15 mW, respectively, under the employed device condition (for SiO2-coated Si substrate), were each applied at 1 Hz for 3,000 cycles at 180° C. (453 K) between the two electrodes on the SWCNT arrays.

Although the external temperature was too low to promote any C—C bond rearrangement, this temperature showed a better effect than room temperature (300 K) for the engineering of the SWCNT arrays into new nanostructures. A higher external temperature caused wall defects and damage to the SWCNT arrays under each applied voltage. After transformation processes of SWCNT arrays, the devices were cooled slowly to prevent fracture due to rapid cooling.

Example 3

Temperature by Electrical Energy

Breakdown occurs when the maximum temperature of the tube reaches the value of the breakdown temperature, which allows the extraction of a simple expression for the breakdown voltage of SWCNTs, including heat generation from Joule self-heating and heat loss to the substrate (50,51).

$$V_{BD}=gL(T_{BD}-T_0)/I_{BD}+I_{BD}R_C$$

Therefore, the maximum temperature at the breakdown voltage is:

$$T_{BD}=(P_{BD}-I^2_{BD}R_C)/gL+T_0$$

Here, $T_{BD}$ is the maximum temperature, $P_{BD}$ is the breakdown power, the combined resistance of the source and drain contacts, $R_C$ is estimated from the inverse slope of the low-bias $I_D$-$V_{SD}$ plot, $R_C\approx(dI_D/dV_{SD})^{-1}$, g is the heat dissipation coefficient in the substrate per unit length and L is length of SWCNT network. From the equation, the calculated maximum temperature is about 1,335 K (1,062 C). At $0.8V_b$, the temperature is calculated as about 1,200 K.

Example 4

SEM and TEM Observations

The SWCNT arrays were prepared on specially designed chips with a window of 40×40 μm² for SEM and TEM imaging. The SWCNT arrays were suspended on an electron transparent window by employing a two-probe device architecture. Two micro-heater electrodes of 10 μm in width were employed around the arrays on the chip for the external heating. The TEM measurements were carried out in a JEOL-3011 high-resolution TEM instrument using an accelerating voltage of 300 kV. The allotropes covered a significant area of the devices, which was verified by taking TEM images at different positions over the sample.

Example 5

Raman Measurements

Raman spectroscopy (LabRAM HR 800, HORIBA Jobin Yvon, HORIBA) was used to investigate structure changes of SWCNT arrays as the applied voltage and the numbers of cycles were changed. The laser excitation wavelengths used were 532 nm (2.33 eV) and 633 nm (1.92 eV), the exposure time was 5 s per spectrum, and the number of data accumulations was 10. A 600 line per mm grating was used, and the confocal hole diameter was set to 100 μm.

Example 6

Electrical Resistance Measurements

To obtain a reasonable estimate of the contact resistance, four equally spaced identical electrodes were fabricated using a magnetron sputter-coater. The estimation used for the interfacial contact resistance assumed that the two-terminal resistance between any two electrodes is the sum of the device resistance of the CNT arrays and the interfacial contact resistance at each contact (52). From the two-terminal I-V characteristics, the resistance R was measured in all test structures, which had a lateral width of 1 μm. The four contact pads were separated by a distance of 2 μm from each other. I-V measurements were conducted between the pairs of contacts A-B, B-C, C-D, A-C, and B-D. The contact resistance at contact pad B and C ($R^c_B$ and $R^c_C$) can be written as:

$$R^c_B = (R_{AB} + R_{BC} - R_{AC})/2$$

$$R^c_C = (R_{BC} + R_{CD} - R_{BD})/2$$

where $R_{AB} = R^c_A + R^d_{AB} + R^c_B$, $R_{BC} = R^c_B + R^d_{BC} + R^c_C$, $R_{AC} = R^c_A + R^d_{AC} + R^c_C$, $R_{CD} = R^c_C + R^d_{CD} + R^c_D$, and $R_{BD} = R^c_B + R^d_{BD} + R^c_D$. The resistance $R^d_{BC}$ is defined as a device resistance between contact pads B and C. Therefore, the two contact resistances and the resistances of the SWCNT array itself were all calculated from data taken on five pairs of device resistances and the values were compared before and after the SWCNT array treatment.

Example 7

Thermal Conductivity Measurements

The measurement of thermal conductivity was performed by using a self-heating 3ω technique (53,54). The 3ω signal correlates with the thermal conductivity through the following equation (53,54):

$$V_{3\omega,rms} = (4I^3RR'L)/\pi^4 kS$$

where L, R and S are the distances between the contacts, the electrical resistance and the cross-sectional area of the sample, respectively, $R' = (\delta R/\delta T)$ is the temperature gradient of the resistance at the chosen temperature and k is the thermal conductivity. The 3ω method was used by the four-point-probe third harmonic characterization method to eliminate the contact resistance and to avoid related spurious signals.

The 3ω signals were used for measuring the thermal conductivity of the SWCNT arrays. A lock-in amplifier (Stanford Research System SR850) was used for obtaining the 3ω signals by amplifying the small voltage and removing the noise. An AC current source (Keithley 6221) was used to provide a stable current supply. All the measurements including the resistance, temperature, and 3ω signals were done under high vacuum ($P<10^{-5}$ Torr) in a Janis Research ST-500 cryogenic probe station to reduce radial heat losses through gas convection. The temperature coefficient of the resistance should be measured in order to obtain the thermal conductivity based on the above equation. The resistance-temperature coefficient of the SWCNT arrays themselves was also measured over the small temperature range of 296-300 K, which is close to the measurement temperature of the 3ω signal. The resistance change of the pristine SWCNT as a function of temperature was about 53.7 $\Omega K^{-1}$. Those of the samples treated at $0.4V_b$ and $0.6V_b$ showed a negative resistance temperature (R(T)) value of $-26.2$ $\Omega K^{-1}$ and $-9.03$ $\Omega K^{-1}$, respectively. On the other hand, R(T) showed a positive value of 1.6 $\Omega K^{-1}$ for the sample treated at $0.8V_b$. By fitting these results according to the equation above, the exponent of the current amplitude $I_0$ was found to be 2.8-3.1 for the samples. These values are very close to the third power predicted from theory. The calculated thermal conductivities were 58.5, 63.5, 13.1 and 301.2 W $mK^{-1}$ for the pristine SWCNT, and samples treated at $0.4V_b$, $0.6V_b$ and $0.8V_b$, respectively (FIG. 7D). The factor of five increase of the effective thermal conductivity in the array treated at $0.8V_b$ is believed to be caused by the highly reduced junction scattering and the thermal pathways to $sp^3$ structures.

As used herein, "consisting essentially of" does not exclude materials or steps that do not materially affect the basic and novel characteristics of the claim. Any recitation herein of the term "comprising", particularly in a description of components of a composition or in a description of elements of a device, can be exchanged with "consisting essentially of" or "consisting of".

While the present invention has been described in conjunction with certain preferred embodiments, one of ordinary skill, after reading the foregoing specification, will be able to effect various changes, substitutions of equivalents, and other alterations to the compositions and methods set forth herein.

This application claims the priority of U.S. Provisional Application No. 62/049,440 filed 14 Sep. 2015 and entitled "Sculpting Carbon Bonds: Allotropic Transformation Through Solid-State Re-engineering of —SP2 Carbon", the whole of which is hereby incorporated by reference

REFERENCES

1. Volder, M., Tawfick, S., Baughman, R. H. & Hart, A. J. Carbon nanotubes: present and future commercial applications. Science 339, 535-539 (2013).
2. Cao, Q. et al. Arrays of single-walled carbon nanotubes with full surface coverage for high-performance electronics. Nat. Nanotech. 8, 180-186 (2013).
3. Zhang, X. et al. Ultrastrong, stiff and lightweight carbon-nanotube fibers. Adv. Mater. 19, 4198-4201 (2007).
4. Lin, H. et al. Conducting polymer composite film incorporated with aligned carbon nanotubes for transparent, flexible and efficient supercapacitor. Sci. Rep. 3, 1353 (2013).
5. Srivastava, A. et al. Carbon nanotube filters. Nat. Mater. 3, 610-614 (2004).
6. Wu, Y. et al. Conformal $Fe_3O_4$ sheath on aligned carbon nanotube scaffolds as high-performance anodes for lithium ion batteries. Nano Lett. 13, 818-823 (2013).
7. Vilatela, J. J., Elliott, J. A. & Windle, A. H. A model for the strength of yarn-like carbon nanotube fibers. ACS Nano 5, 1921-1927 (2011).
8. Hirsch, A. The era of carbon allotropes. Nat. Mater. 9, 868-871 (2010).
9. Jiao, L. et al. Narrow graphene nanoribbons from carbon nanotubes. Nature 458, 877-880 (2009).
10. Hu, M. et al. Compressed carbon nanotubes: a family of new multifunctional carbon allotropes. Sci. Rep. 3, 1331 (2013).
11. Krasheninnikov, A. V. & Banhart, F. Engineering of nanostructured carbon materials with electron or ion beams. Nat. Mater. 6, 723-733 (2007).
12. Wei, D. & Liu, Y. The intramolecular junctions of carbon nanotubes. Adv. Mater. 20, 2815-2841 (2008).
13. Endo, M. et al. Coalescence of double-walled carbon nanotubes: formation of novel carbon bicables. Nano Lett. 4, 1451-1454 (2004).
14. Terrones, M. et al. Molecular junctions by joining single-walled carbon nanotubes. Phys. Rev. Lett. 89, 0755051-0755054 (2002).
15. Yao, Z., Postma, H. W. C., Balents, L. & Dekker, C. Carbon nanotube intramolecular junctions. Nature 402, 273-276 (1999).

16. Papadopoulos, C. et al. Electronic transport in Y-junction carbon nanotubes. Phys. Rev. Lett. 85, 3476-3479 (2000).
17. Zhou, C. W., Kong, J., Yenilmez, E. & Dai, H. J. Modulated chemical doping of individual carbon nanotubes. Science 290, 1552-1555 (2000).
18. Bandaru, P. R., Daraio, C., Jin, S. & Rao, A. M. Novel electrical switching behaviour and logic in carbon nanotube Y-junctions. Nat. Mater. 4, 663-666 (2005).
19. Kis, A. et al. Reinforcement of single-walled carbon nanotube bundles by intertube bridging. Nat. Mater. 3, 153-157 (2004).
20. Terrones, M. et al. Coalescence of single-walled carbon nanotubes. Science 288, 1226-1229 (2000).
21. Li, J. & Banhart, F. The engineering of hot carbon nanotubes with a focused electron beam. Nano Lett. 4, 1143-1146 (2004).
22. Yao, Y. et al. Temperature-mediated growth of single-walled carbon-nanotube intramolecular junctions. Nat. Mater. 6, 283-286 (2007).
23. Collins, P. G., Arnold, M. S. & Avouris, P. Engineering carbon nanotubes and nanotube circuits using electrical breakdown. Science 292, 706-709 (2001).
24. Jia, X. et al. Controlled formation of sharp zigzag and armchair edges in graphitic nanoribbons. Science 323, 1701-1705 (2009).
25. Jin, C., Suenaga, K. & Iijima, S. Plumbing carbon nanotubes. Nat. Nanotech. 3, 17-21 (2008).
26. Yuzvinsky, T. D. et al. Shrinking a carbon nanotube. Nano Lett. 6, 2718-2722 (2006).
27. Mølhave, K. et al. Transmission electron microscopy study of individual carbon nanotube breakdown caused by joule heating in air. Nano Lett. 6, 1663-1668 (2006).
28. Gutierrez, H. R., Kim, U. J., Kim, J. P. & Eklund, P. C. Thermal conversion of bundled carbon nanotubes into graphitic ribbons. Nano Lett. 5, 2195-2201 (2005).
29. Romo-Herrera, J. M. et al. Covalent 2D and 3D networks from 1D nanostructures: Designing new materials. Nano Lett. 7, 570-576 (2007).
30. Jaber-Ansari, L. et al. Mechanism of very large scale assembly of SWNTs in template guided fluidic assembly process. J. Am. Chem. Soc. 131, 804-808 (2009).
31. Xiong, X. et al. Building highly organized single-walled carbon nanotube networks using template guided fluidic assembly. Small 3, 2006-2010 (2007).
32. Somu, S. et al. Topological transition in carbon nanotube networks via nanoscale confinement. ACS Nano 4, 4142-4148 (2010).
33. Yao, Z., Kane, C. L. & Dekker, C. High-field electrical transport in single-wall carbon nanotubes. Phys. Rev. Lett. 84, 2941-2944 (2004).
34. Yoon, M. et al. Zipper mechanism of nanotube fusion: theory and experiment. Phys. Rev. Lett. 92, 0755041-0755044 (2004).
35. Ajayan, P. M., Ravikumar, V. & Charlier, J.-C. Surface reconstructions and dimensional changes in single-walled carbon nanotubes. Phys. Rev. Lett. 81, 1437-1440 (1998).
36. Hernandez, E. et al. Fullerene coalescence in nanopeapods: a path to novel tubular carbon. Nano Lett. 3, 1037-1042 (2003).
37. Endo, M. et al. Atomic nanotube welders: boron interstitials triggering connections in double-walled carbon nanotubes. Nano Lett. 5, 1099-1105 (2005).
38. Endo, M. et al. Nanotube coalescence-inducing mode: a novel vibrational mode in carbon systems. Small 2, 1031-1036 (2006).
39. Fantini, C. et al. Resonance Raman study of linear carbon chains formed by the heat treatment of double-wall carbon nanotubes. Phys. Rev. B 73, 1934081-1934084 (2006).
40. Villalpando-Paez, F. et al. Raman spectroscopy study of heat-treated and boron-doped double wall carbon nanotubes. Phys. Rev. B 80, 0354191-03541914 (2009).
41. Filho, S. et al. Competing spring constant versus double resonance effects on the properties of dispersive modes in isolated single-wall carbon nanotubes. Phys. Rev. B 67, 035427-035434 (2003).
42. Papworth, A. P. et al. Electron-energy-loss spectroscopy characterization of the $sp^2$ bonding fraction within carbon thin films. Phys. Rev. B 62, 12628-12631 (2000).
43. Okada, K., Kimoto, K., Komatsu, S. & Matsumoto, S. $Sp^2$ bonding distributions in nanocrystalline diamond particles by electron energy loss spectroscopy. J. Appl. Phys. 93, 3120-3122 (2003).
44. Castrucci, P. et al. Probing the electronic structure of carbon nanotubes by nanoscale spectroscopy. Nanoscale 2, 1611-1625 (2010).
45. Prawer, S. et al. The Raman spectrum of nanocrystalline diamond. Chem. Phys. Lett. 332, 93-97 (2000).
46. Mykhaylyka, O. O., Solonin, Y. M., Batchelder, D. N. & Brydson., R. Transformation of nanodiamond into carbon onion. J. Appl. Phys. 97, 074302-074315 (2005).
47. Arenal, R. et al. Diamond nanowires and the insulator-metal transition in ultrananocrystalline diamond films. Phys. Rev. B 75, 195431-11 (2007).
48. Singha, A., Ghosh, A., Roy, A. & Ray, N. R. Quantitative analysis of hydrogenated diamondlike carbon films by visible Raman spectroscopy. J. Appl. Phys. 100, 044910 (2006).
49. Sorbello, R. Theory of electromigration. Solid State Phys. 51, 159-231 (1997).
50. Pop, E., Mann, E. A., Goodson, K. E. & Dai, H. Electrical and thermal transport in metallic single-wall carbon nanotubes on insulating substrates. J. Appl. Phys. 101, 093710 (2007).
51. Liao, A. et al. Thermal dissipation and variability in electrical breakdown of carbon nanotube devices. Phys. Rev. B 82, 205406 (2010).
52. Kim, Y. L. et al. Highly aligned scalable platinum-decorated single-wall carbon nanotube arrays for nanoscale electrical interconnects. ACS Nano 3, 2818-2826 (2009).
53. Li, B. et al. Ultra-thin SWNTs films with tunable, anisotropic transport properties. Adv. Funct. Mater. 21, 1810-1815 (2011).
54. Choi, T., Poulikakos, D., Tharian, J. & Sennhauser, U. Measurement of the thermal conductivity of individual carbon nanotubes by the four-point three-w method. Nano Lett. 6, 1589-1593 (2006).

The invention claimed is:
1. A method for allotropic transformation of a carbon nanotube material, the method comprising the steps of:
   (a) providing a network of the carbon nanotube material, the network spanning a gap between two electrodes and in electrical contact with each of the two electrodes;
   (b) applying a voltage ($V_a$) between the electrodes at a temperature above ambient temperature, wherein the voltage is less than the breakdown voltage ($V_b$) of the network of carbon nanotube material;
   (c) cyclically reversing the polarity of $V_a$ for a total of "n" voltage cycles, whereby at least a portion of the carbon nanotube material undergoes allotropic transformation.

2. The method of claim 1, wherein 1000≤n≤3000, wherein $V_a$ is in the range from $0.4V_b$ to $0.8V_b$, wherein the polarity of $V_a$ is switched at a frequency of from about 0.1 to about 200 Hz, wherein $V_a$ is applied as a series of DC pulses, wherein each pulse is applied for a period of from about 2 msec to about 1000 msec, wherein each cycle consists of a positive pulse of amplitude $V_a$, a negative pulse of amplitude $V_a$, and periods between the pulses where $V_a=0$.

3. The method of claim 2, wherein the positive and negative pulses last for about 10% of the cycle.

4. The method of claim 1, wherein the carbon nanotube material comprises single walled carbon nanotubes (SW-CNT), multiwalled carbon nanotubes (MWCNT), or carbon nanotube fiber.

5. The method of claim 4, wherein the SWCNT, MWCNT, or carbon nanotube fibers are aligned along an axis extending between the electrodes.

6. The method of claim 1, wherein the carbon nanotube material comprises carbon nanotubes at a density of about 18,000-22,000 SWCNT per $\mu m^r$.

7. The method of claim 1, wherein the carbon nanotube material comprises SWCNT and: (i) the allotropic transformation produces an increase in SWCNT diameter of about 30% to about 40%, or (ii) the allotropic transformation produces small bundles of SWCNT having less than 10 SWCNT per bundle, or (iii) the allotropic transformation produces large bundles of SWCNT having 10 or more SWCNT per bundle.

8. The method of claim 1, wherein $V_a$ is about $0.6V_b$, wherein the carbon nanotube material comprises SWCNT, and the allotropic transformation produces multiwalled carbon nanotubes (MWCNT).

9. The method of claim 1, wherein $V_a$ is from about $0.6V_b$ to about $0.8V_b$ and the allotropic transformation produces multilayered graphene nanoribbons (MGNR).

10. The method of claim 8, wherein the allotropic transformation produces multilayered graphitic nanoribbons (MGNR).

11. The method of claim 1, wherein carbon-carbon $sp^2$ bonds of the carbon nanotube material are rearranged and coalescence-induced modes increase in Raman spectra of the material.

12. The method of claim 1, wherein some $sp^2$ bonds in the carbon nanotube material are converted to $sp^a$ bonds.

13. The method of claim 1, wherein steps (b) and (c) are performed at a temperature in the range from about 120° C. to about 400° C.

14. The method of claim 1, wherein steps (b) and (c) are performed in a vacuum.

15. The method of claim 1, wherein the carbon nanotube material and two electrodes are part of a circuit on a chip, and said method is part of a manufacturing process for the chip.

16. The method of claim 1, wherein structural defects initially present in the carbon nanotube material are reduced.

17. The method of claim 1, wherein the allotropic transformation progresses from forming MWCNT to forming MGNR as the number of voltage cycles increases, and wherein the number of voltage cycles is selected so as to produce a desired allotropic form or mixture of allotropic forms of carbon material.

* * * * *